(12) United States Patent
Subhash et al.

(10) Patent No.: US 12,476,016 B2
(45) Date of Patent: Nov. 18, 2025

(54) HIGH DENSITY $UO_2$ AND HIGH THERMAL CONDUCTIVITY $UO_2$ COMPOSITES BY SPARK PLASMA SINTERING (SPS)

(71) Applicant: University of Florida Research Foundation, Inc., Gainesville, FL (US)

(72) Inventors: Ghatu Subhash, Gainesville, FL (US); Ronald Howard Baney, Gainesville, FL (US); James S. Tulenko, Gainesville, FL (US); Edward Mckenna, III, Portland, OR (US); Lihao Ge, San Jose, CA (US); Sunghwan Yeo, Gainesville, FL (US)

(73) Assignee: UNIVERSITY OF FLORIDA RESEARCH FOUNDATION, INC., Gainesville, FL (US)

( * ) Notice: Subject to any disclaimer, the term of this patent is extended or adjusted under 35 U.S.C. 154(b) by 419 days.

(21) Appl. No.: 17/724,017

(22) Filed: Apr. 19, 2022

(65) Prior Publication Data
US 2022/0270768 A1    Aug. 25, 2022

Related U.S. Application Data

(63) Continuation of application No. 16/996,715, filed on Aug. 18, 2020, now Pat. No. 11,410,782, which is a
(Continued)

(51) Int. Cl.
*G21C 21/02* (2006.01)
*B22F 3/105* (2006.01)
(Continued)

(52) U.S. Cl.
CPC ............... *G21C 21/02* (2013.01); *B22F 3/105* (2013.01); *C04B 35/645* (2013.01); *G21C 3/045* (2019.01); *G21C 3/62* (2013.01); *Y02E 30/30* (2013.01)

(58) Field of Classification Search
None
See application file for complete search history.

(56) References Cited

U.S. PATENT DOCUMENTS

| 2,755,925 | A | * | 7/1956 | Boccon-Gibod | ....... B21C 33/00 72/38 |
| 3,213,032 | A | | 10/1965 | Hammond | |

(Continued)

FOREIGN PATENT DOCUMENTS

| JP | 05318427 A | * | 12/1993 |
| JP | 2000128648 A | * | 5/2000 |

(Continued)

OTHER PUBLICATIONS

Machine translation of JP-05318427-A, retrieved from EPO database Jul. 3, 2024 (Year: 2024).*
(Continued)

*Primary Examiner* — Timothy Kennedy
(74) *Attorney, Agent, or Firm* — Thomas | Horstemeyer, LLP

(57) ABSTRACT

Embodiments of the invention are directed to a method for production of a nuclear fuel pellet by spark plasma sintering (SPS), wherein a fuel pellet with more than 80% TD or more than 90% TD is formed. The SPS can be performed with the imposition of a controlled uniaxial pressure applied at the maximum temperature of the processing to achieve a very high density, in excess of 95% TD, at temperatures of 850 to 1600° C. The formation of a fuel pellet can be carried out in one hour or less. In an embodiment of the invention, a nuclear fuel pellet comprises $UO_2$ and a highly thermally conductive material, such as SiC or diamond.

17 Claims, 29 Drawing Sheets

Related U.S. Application Data continuation of application No. 14/420,702, filed as application No. PCT/US2013/055132 on Aug. 15, 2013, now Pat. No. 10,790,065.

(60) Provisional application No. 61/683,384, filed on Aug. 15, 2012.

(51) Int. Cl.
  *C04B 35/645* (2006.01)
  *G21C 3/04* (2006.01)
  *G21C 3/62* (2006.01)

(56) References Cited

U.S. PATENT DOCUMENTS

| | | | |
|---|---|---|---|
| 3,344,080 | A | 9/1967 | Thomas |
| 3,354,044 | A | 11/1967 | Law |
| 3,609,095 | A | 9/1971 | Wyatt |
| 3,872,022 | A | 3/1975 | De Hollander |
| 4,885,147 | A | 12/1989 | Murakami et al. |
| 5,211,905 | A | 5/1993 | Wood |
| 6,251,309 | B1 | 6/2001 | Song et al. |
| 2008/0021994 | A1 | 1/2008 | Grelewicz et al. |
| 2008/0219904 | A1 | 9/2008 | Gregson |
| 2009/0000268 | A1 | 1/2009 | Yurash |
| 2011/0299645 | A1 | 12/2011 | Kim et al. |
| 2012/0183116 | A1 | 7/2012 | Hollenbach et al. |
| 2016/0372215 | A1 | 12/2016 | Kim et al. |

FOREIGN PATENT DOCUMENTS

| | | | |
|---|---|---|---|
| JP | 2006504086 | | 2/2006 |
| JP | 2011011927 | A * | 1/2011 |
| JP | 2011033504 | | 2/2011 |

OTHER PUBLICATIONS

Machine translation of JP-2000128648-A, retrieved from EPO database Jul. 3, 2024 (Year: 2024).*
Machine translation of JP-2011011927-A, retrieved from EPO database Jul. 3, 2024 (Year: 2024).*
Muta et al, Preparation of Nitride Fuel by Spark Plasma Sintering Technique, Mater. Res. Soc. Symp. Proc. vol. 1043, 2008 (Year: 2008).*
Papynov et al, Synthesis of High-Density Pellets of Uranium Dioxide by Spark Plasma Sintering in Dies of Different Types, Radiochemistry, 2018, vol. 60, No. 4, pp. 362-370 (Year: 2018).*
IAEA Technical Reports Series No. 59, "Thermal Conductivity of Uranium Dioxide", Apr. 1965.
Tulenko, J. et al., "Development of Innovative Accident Tolerant High Thermal Conductivity UO2—Diamond Composite Fuel Pellets," (Abstract), Source: Documents at Idaho National Laboratory (NEUP search), Apr. 26, 2012, p. 1.
Baney, R. et al., "Developing a High Thermal Conductivity Fuel with Silicon Carbide Additives," (Abstract) Source: Documents at Idaho National Laboratory (NEUP search), Sep. 15, 2011, p. 1.
Ge, L. et al., "Densification of uranium dioxide fuel pellets prepared by spark plasma sintering (SPS)," Journal of Nuclear Materials, 2013, pp. 1-9, vol. 435.
Gonzaga, R. et al., "Study of the microstructural variations (average grain size) on UO2 pellets in relation to the Si and Al contents, in production scale," [online, retrieved Jul. 1, 2015] from: www.enaoot.ora/nukleo/odfs/0614 artiao.pdf, pp. 1-6.
Hungria, T. et al., "Spark Plasma Sintering as a Useful Technique to the Nanostructurization of Piezo-Ferroelectric Materials," Advanced Engineering Materials, 2009, pp. 615-631, vol. 11, No. 8.
Joung, C.Y. et al., "Fabrication method for UO2 pellets with large grains or a single grain by sintering in air," Journal of Nuclear Materials, 2008, pp. 209-212, vol. 375.
Nenoff, T.M. et al., "Synthesis and Low Temperature In Situ Sintering of Uranium Oxide Nanoparticles," Chem. Mater., 2011, pp. 5185-5190, vol. 23.
Song, K.W. et al., "Grain size control of UO2 pellets by adding heat-treated U3Oa particles to UO2 powder," Journal of Nuclear Materials, 2003, pp. 204-211, vol. 317.
Tulenko, J.S. et al., "An Innovative High Thermal Conductivity Fuel Design Final Report, Period: Jul. 14, 2004-Jul. 14, 2007", Nuclear Engineering Education Research Program, Project No. DE-FG07-041014598, Submitted to the U.S. Department of Energy. :iv Oct. 14, 2007, pp. 1-77.
Fink, J.K., "Thermophysical properties of uranium dioxide," Journal of Nuclear Materials, 2000, pp. 1-18, vol. 279.
Oghbaei, M. et al., "Microwave versus conventional sintering: A review of fundamentals, advantages and applications," Journal of Alloys and Compounds, 2010, pp. 175-189, vol. 494.
Subhash, G. et al., "Development of Innovative High Thermal Conductivity UO2 Ceramic Composites Fuel Pellets with Carbon Nano-Tubes Using Spark Plasma Sintering," Nuclear Energy University Programs, U.S. Department of Energy, Project No. 10-917, pp. 1-16, (2014).
Baney, R. et al., "Developing a High Thermal Conductivity Fuel with Silicon Carbide Additives," Nuclear Energy University Programs, U.S. Department of Energy, Project No. 09-773, pp. 1-20, (2011).
Yeo, S. et al., "Enhanced thermal conductivity of uranium dioxide-silicon carbide composite fuel pellets prepared by Spark Plasma Sintering (SPS)," Journal of Nuclear Materials, 2013, pp. 66-73, vol. 433.
Burkes, D.E. et al., "An Overview of Current and Post W-UO2 CERMET Fuel Fabrication Technology;" Idaho National Laboratory, U.S. Department of Energy, Space Nuclear Conference 2007, Boston, MA, Jun. 24-Jun. 28, 2007, Published Jun. 1, 2007.
Muta et al., "Thermal and Mechanical Properties of Uranium Nitride Prepared by SPS Technique", J Mater Sci (2008) 43:6429-6434.
Tokita et al., "Mechanism of spark plasma sintering, Proceedings of the International Symposium on Microwave, Plasma and Thermochemical Processing of Advanced Materials, Osaka Universities, Japan, 1997".
Verall et al., "Silicon carbide as an inert-matrix for a thermal reactor fuel", Journal of Nuclear Materials 274 (1999) 54-60.
Mizuuchi, "Thermal Conductivity of Diamond Particle Dispersed Aluminum Matrix Composites Fabricated in Solid-liquid Co-existent State by SPS", Composites: Part B 42 (2011) 1029-1034.
Khan et al., "Enhanced Thermal Conductivity for LWR Fuel", Nuclear Technology vol. 169 Jan. 2010.

* cited by examiner

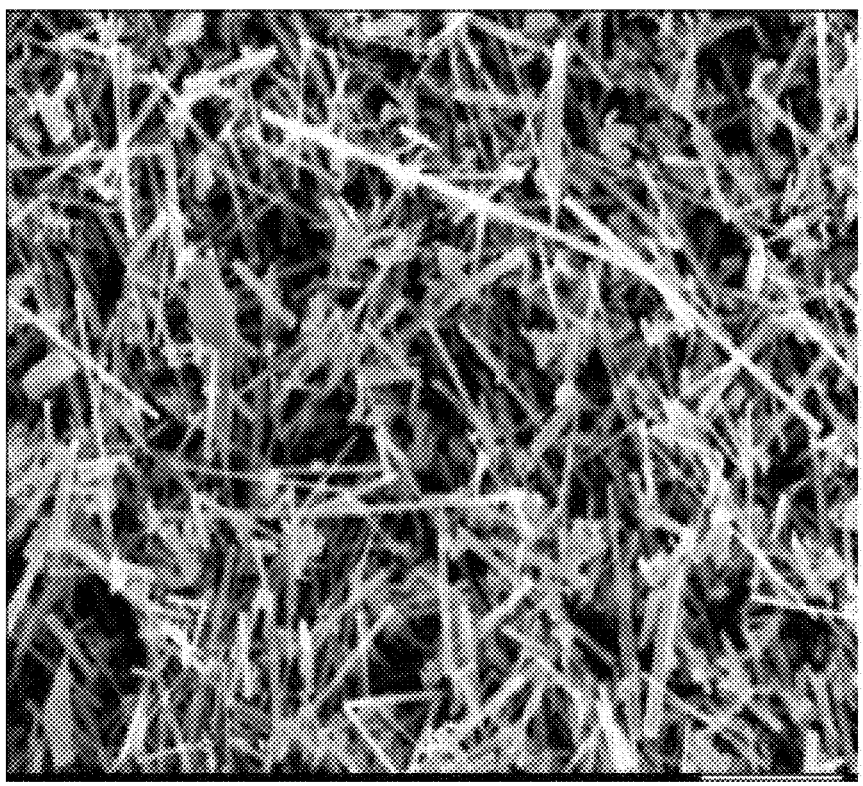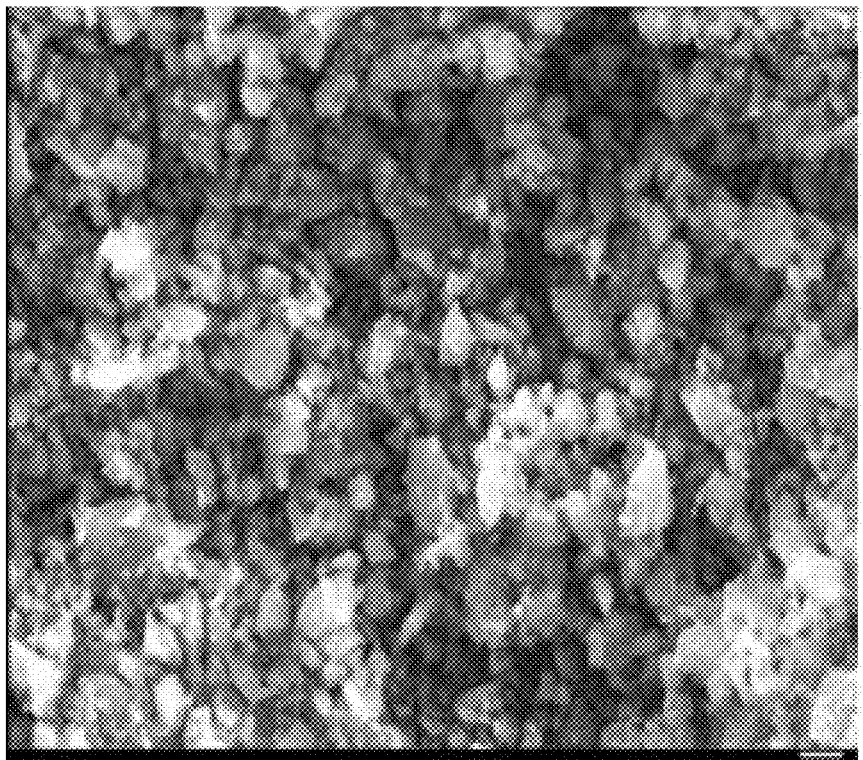
Figure 24

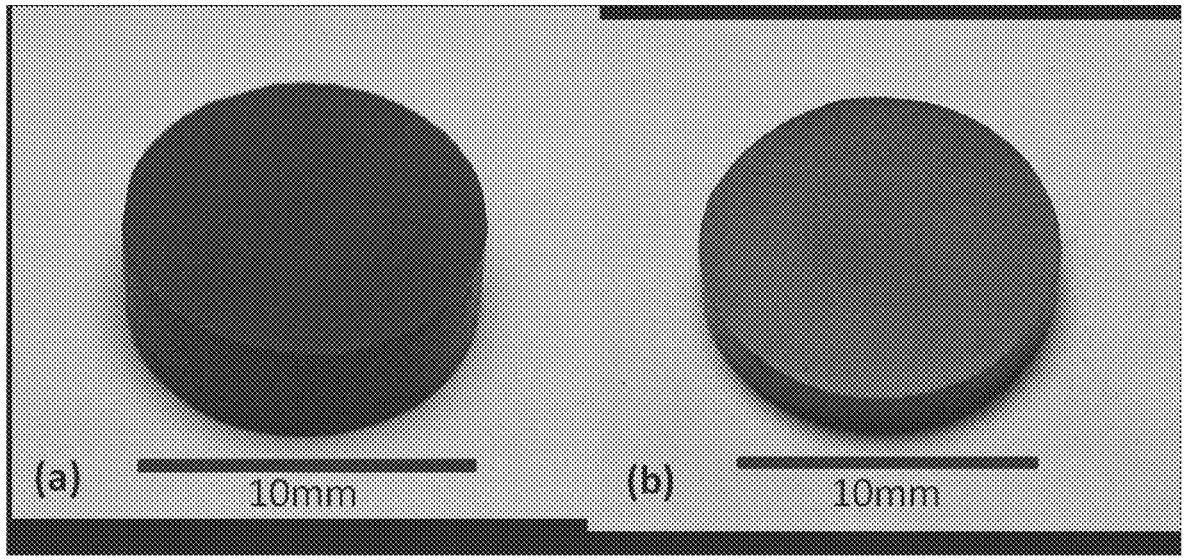
Figure 25A                    Figure 25B
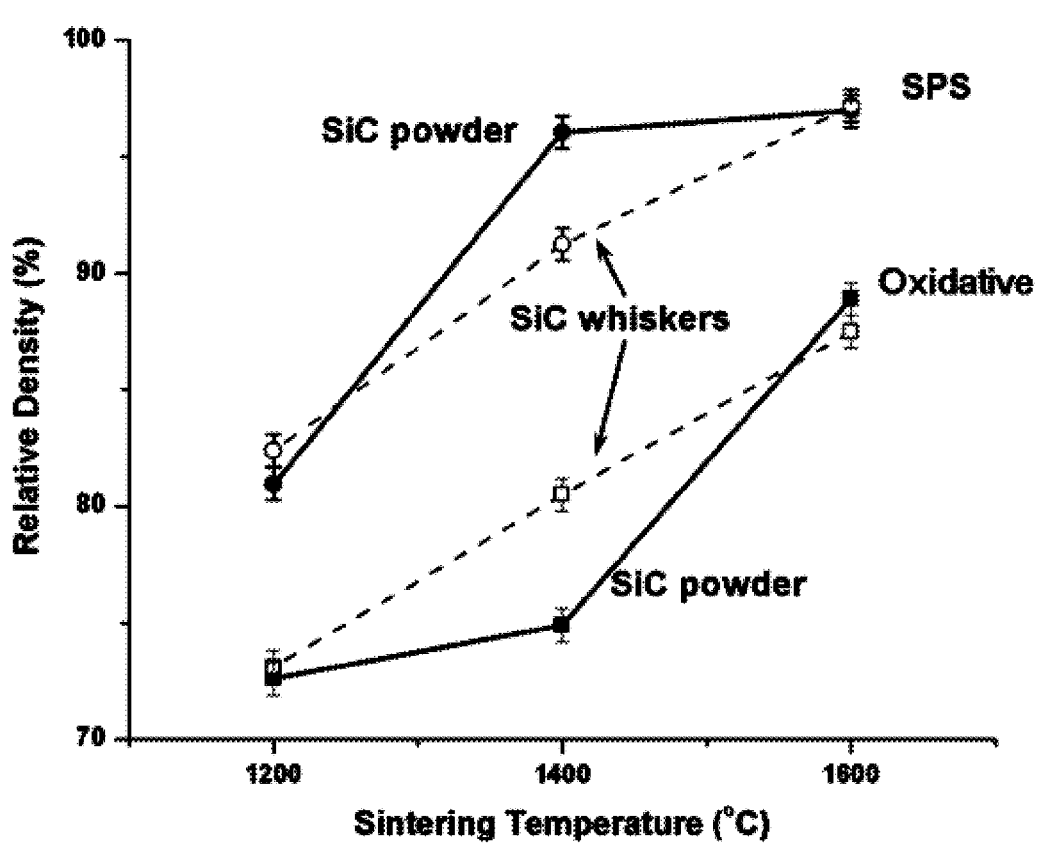
Figure 26

HIGH DENSITY UO₂ AND HIGH THERMAL CONDUCTIVITY UO₂ COMPOSITES BY SPARK PLASMA SINTERING (SPS)

CROSS-REFERENCE TO RELATED APPLICATION

The present application is a continuation application of U.S. Non-Provisional application Ser. No. 16/996,715, filed Aug. 18, 2020, which is a continuation application of U.S. Non-Provisional application Ser. No. 14/420,702, filed Feb. 10, 2015, which is the U.S. national stage application of International Patent Application No. PCT/US2013/055132, filed Aug. 15, 2013, which claims the benefit of U.S. Provisional Application Ser. No. 61/683,384, filed Aug. 15, 2012, all of which are hereby incorporated by reference in their entireties.

STATEMENT OF GOVERNMENTAL INTEREST

This invention was made with government support under DE-AC07-05ID14517 awarded by the Department of Energy. The government has certain rights in the invention.

BACKGROUND OF INVENTION

There are many types of nuclear fuels that can be fabricated for a commercial plant, including metals, metal oxides, and metal nitrides. Uranium dioxide ($UO_2$) is the most commonly used fuel material in commercial nuclear power reactors and is desired for its transient accident resistance. $UO_2$ has the advantages of a high melting point, good high-temperature stability, good chemical compatibility with cladding and coolant, and resistance to radiation. The main disadvantage of $UO_2$ is its low thermal conductivity, for example, about 2.8 W/m-K at 1000° C. During a reactor's operation, because of the low thermal conductivity of $UO_2$, there is a large temperature gradient in the $UO_2$ fuel pellet, causing a very high centerline temperature, and introducing thermal stresses, which lead to extensive fuel pellet cracking. Cracks add to the release of fission product gases after high burnup. Additionally, the high fuel operating temperature increases the rate of fission gas release and fuel pellet swelling caused by fission gases bubbles. The fission gas release and fuel swelling limit the life time of $UO_2$ fuel in a reactor. In addition, the high centerline temperature and large temperature gradient in the fuel pellets lead to a large amount of stored heat and an increase of the Zircaloy cladding temperature in a loss of coolant accident (LOCA). The rate of Zircaloy-water reaction, which generates potentially explosive hydrogen gas, becomes significant at temperatures above 1200° C. The $ZrO_2$ layer that is generated on the surface of the Zircaloy cladding affects the heat conduction and can cause a Zircaloy cladding rupture.

The thermal conductivity of $UO_2$ is affected by the changes that take place in the fuel upon irradiation while used. During irradiation, fission products accumulate in the $UO_2$ matrix, causing fuel swelling. Fission products dissolved in the $UO_2$ lattice serve as phonon scattering centers that reduce the thermal conductivity of the $UO_2$ fuel. Precipitated fission products have much higher thermal conductivities than does $UO_2$ and provide a positive contribution to the thermal conductivity of $UO_2$ fuel. Fission product gases initially form in irradiated fuel as dispersed atoms within the $UO_2$ lattice, coalesce to form small bubbles that contribute to a reduction of the fuel's thermal conductivity by acting as phonon scattering centers. At temperatures below 1000° C., uranium dioxide retains essentially all the fission gases, but above this temperature, gases are released, and little fission gas remains in those regions of the fuel at temperatures in excess of 1800° C. Radiation damage from neutrons, α-decay and fission products, increases the number of lattice defects, which contributes to a reduction of the thermal conductivity of $UO_2$ fuel. The radiation-induced decrease in the thermal conductivity of $UO_2$ is large at low temperatures. Oxygen defects are known to anneal at around 500 K, and uranium defects largely anneal at 1000 K, hence the majority of changes in the thermal conductivity of $UO_2$ are observed below 1000 K. A fuel with an increased thermal conductivity could allow the output of a reactor to be increased while maintaining the desired fuel core and cladding temperatures.

Preparation of conventional $UO_2$ pellets consists of preparation of a green body from powders and sintering the powder compact in a furnace heated to and maintained at 1600-1700° C. for up to 24 hours in inert or oxidative environment. The initial $UO_{2+x}$ powder is mixed with $U_3O_8$ to achieve hyper stoichiometry, generally with an optimal O to U ratio of 2.25 which allows for enhanced sinterability of the $UO_2$ powder due to the increased diffusivity of uranium atoms through vacancies. Addition of 3-5% $U_3O_8$ powder to $UO_2$ granules has also been found to be beneficial in reducing end-chipping and improving the pellet integrity after sintering. The sintered pellets are reduced to stoichiometric $UO_{2.00}$ by the procedure outlined in ASTM-C1430-07. Temperature ramp rates using the conventional method are limited to less than 5° C./minutes and it can take up to seven hours to reach the desired sintering temperature of 1700° C. and nearly as long for the furnace to cool to room temperature. The powder compact is not held in a confined container and, therefore, the dimensions of the sintered pellet cannot be maintained to tight tolerances from one sintering run to another. Sintered diameter of the pellet has also been found to be a linear function of green density. To achieve desired dimensional tolerances, subsequent machining operations, such as grinding, are often employed. The long duration exposure to high temperature during sintering allows formation of reaction products, which may degrade the properties and mechanical integrity of the pellet.

The present inventors have conducted research with the goal of increasing the thermal conductivity of $UO_2$ fuel pellets in a manner that has little detrimental affect on the neutronic property of $UO_2$, as disclosed in Tulenko et al., Nuclear Engineering Education Research Program Project No. DE-FG07-04ID14598, Final Report, Oct. 14, 2007. The direction has been to incorporate a material with high thermal conductivity with the $UO_2$ pellet. A highly conductive material that has been combined with $UO_2$ is silicon carbide (SiC), where a single crystal of SiC has a thermal conductivity that is 60 times greater than that of $UO_2$ at room temperature and 30 times higher at 800° C. Silicon carbide also provides a low thermal neutron absorption cross section, a high melting point, good chemical stability, and good irradiation stability. The composite of SiC with $UO_2$ formed between SiC whiskers and $UO_2$ particles or with SiC coated $UO_2$ has been examined. Coating was found to be ineffective as the SiC precursor, allylhydridopolycarbosilane (AHPCS), oxidized by the $UO_2$ during coating and a CVD precursor decomposed without formation of SiC during that process. Ball milling was required to form a homogeneous mixture from the SiC Whiskers and $UO_2$. Hot pressing at the relatively low temperature of 1200° C. to avoid reaction between the SiC and $UO_2$ and high pressure was required to achieve a dense pellet because the whiskers interfere with matrix particle rearrangement during sintering. Scanning electron microscope (SEM) images of the sintered pellets showed grains did not form with sizes similar to grains of pure $UO_2$ pellets and that SiC whiskers are intact within the uranium oxide matrix. Thermal conductivity of the composite was not reported. Hence, there remains the goal of achieving a good quality nuclear fuel with improved stability and thermal conductivities.

BRIEF SUMMARY

An embodiment of the invention is directed to a method for preparing a nuclear fuel pellet where a powder comprising a nuclear fuel is sintered by spark plasma sintering (SPS) to a maximum temperature of 850 to 1600° C. where the rate of increase after achieving 600° C. is at least 50° C./minute with the maximum temperature held for 20 minutes or less. A controlled pressure of 25 to 100 MPa can be applied while holding the maximum pressure, to yield a nuclear fuel pellet with a density greater than 90% TD. The nuclear fuel comprises uranium oxide, uranium nitride, thorium oxide, plutonium oxide, and/or other fissionable isotope oxide or nitride. The powder can include a thermally conductive material with a thermal conductivity greater than 10 W/mK to result in the formation of nuclear fuel pellets, according to an embodiment of the invention, comprising $UO_2$ and a thermally conductive material having a thermal conductivity, where the fuel pellets have a density of at least 80% TD with the thermally conductive material uniformly distributed through the fuel pellet. The thermally conductive material can be SiC, diamond, BeO, a metal, or a metal alloy.

BRIEF DESCRIPTION OF DRAWINGS

FIG. 8A shows a fracture surface before thermal etching and FIG. 8B shows the polished surface after thermal etching, according to an embodiment of the invention.

FIG. 24 shows SEM images of SiC whiskers, top, and powder, bottom, used for the preparation of fuel pellets comprising $UO_2$ and SiC particles, according to an embodiment of the invention.

FIGS. 25A and 25B show photographic images of $UO_2$—SiC composite fuel pellets formed by a) oxidative sintering and b) SPS, according to an embodiment of the invention.

FIG. 26 shows plots of the density of $UO_2$—SiC (10 vol %) composite fuel pellets sintered by SPS, according to an embodiment of the invention, or oxidative sintering at various temperatures.

DETAILED DISCLOSURE

Embodiments of the invention are directed to the preparation of superior fuels for nuclear power plants comprising $UO_2$, other metal oxides, metal nitrides, or their composites with high thermal conductivity materials. The $UO_2$ can have up to 19.9 percent U-235 enrichment. The $UO_2$ can contain other fissionable isotopes, such as thoria or plutonia. The superior fuels are enabled by employing spark plasma sintering (SPS) as the method of preparing the fuel pellets. Spark plasma sintering (SPS), also known as pulsed electric current sintering (PECS), is a field assisted sintering technique that allows production of fully dense materials while applying high heating rates and short dwell times. A pulsed DC current is passed through the punches, die, and, in some cases, the specimen, depending on its electrical properties. SPS is a technique that has been developed for the rapid densification of ceramic materials, hard-metals, cermets, Al-based alloys, and other metallic powders. In embodiments of the invention, fuel pellets are prepared at relatively low temperatures in very short periods of sintering to yield superior fuel pellet with large grain sizes and high hardness. Throughout the following description, the formation of structures and sintering phenomena are rationalized mechanistically, where the mechanisms recited are consistent with the observations of the experiments. However, embodiments of the invention are not limited by the mechanism disclosed herein.

Figure 1:
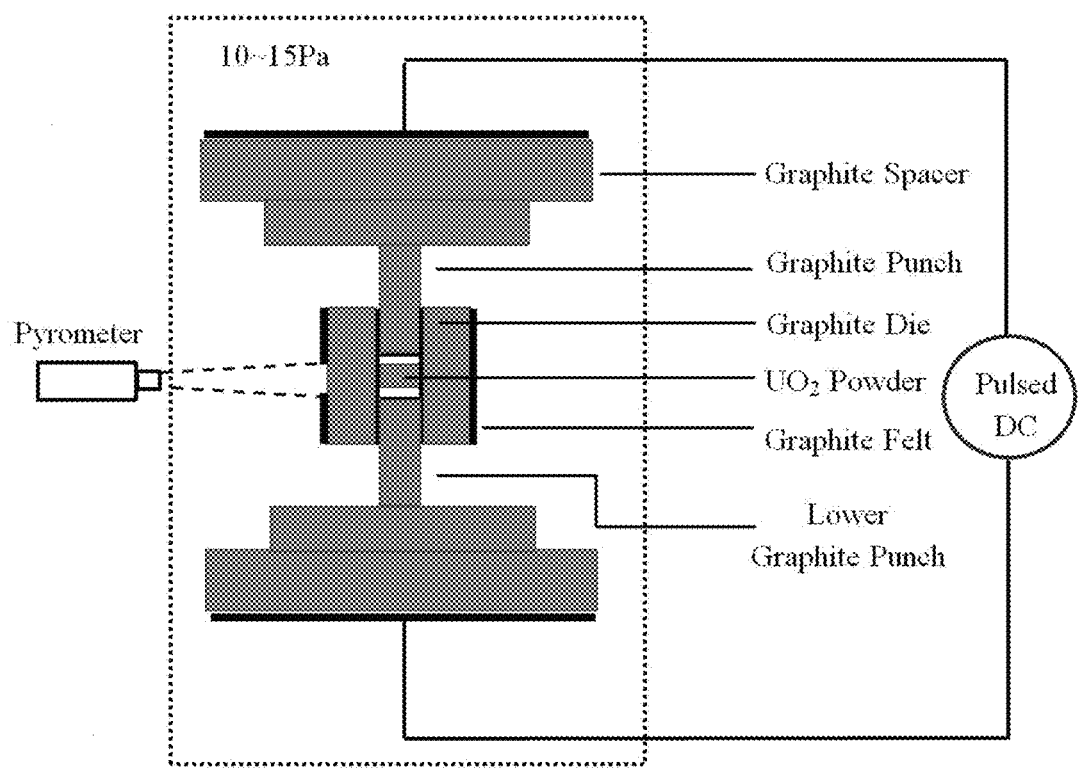
FIG. 1 shows a schematic of a die assembly and sintering chamber of a spark plasma sintering (SPS) device, as used in embodiments of the invention.
Figure 2:
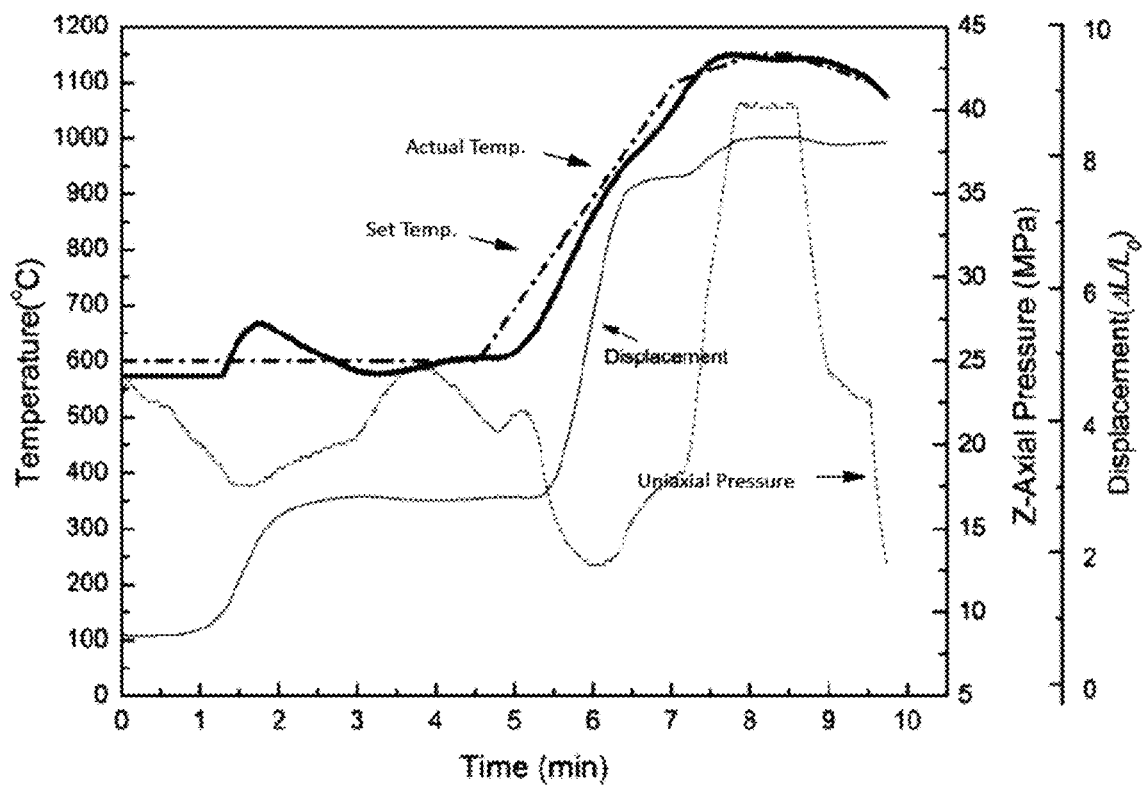
FIG. 2 shows an SPS parameter profile, where the set and measured (actual) temperature, die displacement, and pressure are tracked during an exemplary ten minute sintering run using $UO_2$, according to an embodiment of the invention.
Figure 3:
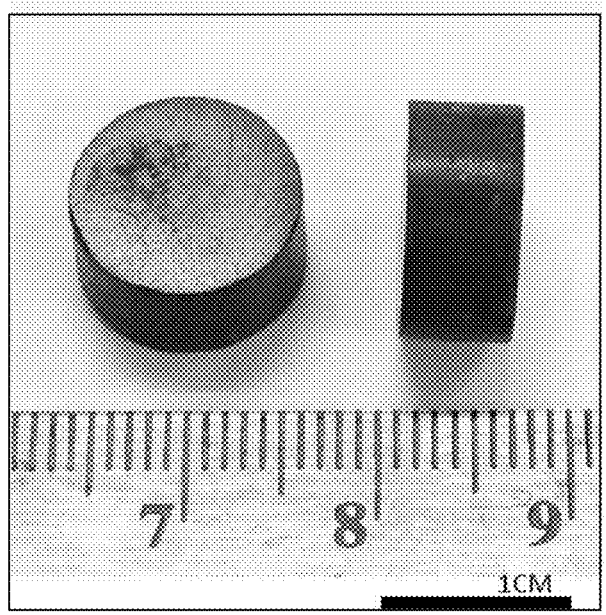
FIG. 3 shows a photograph of a fuel pellet consisting of $UO_2$ prepared by SPS, according to an embodiment of the invention.

In an embodiment of the invention, the method of preparing $UO_2$ comprising fuel pellets, is by SPS. In this method, a die assembly, as illustrated in FIG. 1, is loaded with a starting powder comprising $UO_2$, other metal oxide or metal nitride. The loaded die assembly is inserted into a sintering chamber of a SPS and the chamber is depressurized, for example, to less than 100 Pa, to less than 50 Pa, to less than 30 Pa, to less than 20 PA, to 10 Pa, to less than 10 Pa, or any pressure that permits sufficient removal of gas from within the loaded mixture. A pulsing current, for example, of 100 to 8000 A, of 200 to 2000 A, of 300 to 1500 A, of 400 to 1000 A, of 600 to 800 A, or any current or current range that promotes densification of the loaded fuel pellet precursor can be applied. An on-off current pulse can have any workable ratio, for example, an on-off ratio of 12:2. An exemplary plot of temperatures and pressures applied in a typical SPS sintering run is shown in FIG. 2. The die assembly can be heated in a controlled manner with a heating rate of, for example, 50° C./min, 100° C./min, 150° C./minute, 200° C./min, or any other heating rate, where an optimal heating rate for a given pressure is that by which one achieves an optimal pellet structure in a minimal period of time. Heating is maintained up to a desired maximum sintering temperature or to the vicinity of the maximum temperature, for example, within about 100° C. or less of the maximum temperature, and heating at a lower second heating rate, for example one half or one quarter of the first heating rate to the maximum sintering temperature of, for example, 850° C. to 1600° C., for example, 1050° C., 1035° C., or 1045° C. The temperature is then held at the maximum temperature for a desired hold time, for example, 0.5 minutes to 20 minutes or more, for example, 5 minutes. The pressure can be one that is inherently imposed by or on the die to maintain contact between the various surfaces of the assembly, and herein is recited as a 'non-controlled' pressure, for example, a pressure of 14 MPa to 24 MPa during a portion of the sintering process, for example, all of the sintering time or, for example, until a desired temperature is achieved. If desired, at a given temperature during sintering, an additional uniaxial pressure, herein recited as a 'controlled' pressure, can be applied, for example, a pressure of 20 to 80 MPa, for example, 40 MPa. By implementation of the SPS method, according to an embodiment of the invention, a fuel pellet well suited for use as a nuclear energy generator can be prepared in a very short sintering time, for example, a period of less than two hours, including cooling to ambient temperature in about 40 minutes.

In embodiments of the invention, no alteration of the oxide stoichiometry by the mixing of powders is required to enhance the sinterability of the $UO_{2+x}$, where a powder of any reasonable stoichiometry can be used. A traditional reduction of the oxide to $UO_{2.00}$ is not required, according to an embodiment of the invention, where, by appropriate processing conditions for SPS, $UO_2$ powder can be reduced into the stoichiometric form of $UO_{2.00}$ without any need for a post-sintering reduction in a $H_2$ atmosphere.

The fuel pellets, according to an embodiment of the invention, can be a $UO_2$ comprising fuel pellet, where the density is at least 80% theoretical density (TD) of the materials in their desired proportions and at a desired temperature or range of temperatures; for example, a fuel pellet consisting of $UO_2$ can achieve a density in excess of 95% TD, even up to 97% TD or more. The grain size of the $UO_2$ can be from 2 to about 24 µm and even up to 100 µm, and the porosity of the fuel pellet is primarily from intra-granular pores and not from inter-granular pores. Fuel pellets with grain sizes of 6 to 9 µm, which exhibit superior thermal conductivities to pellets prepared by other methods, are readily prepared in short production times. For a fuel pellet consisting of $UO_2$, according to an embodiment of the invention, inter-granular pores are nearly absent. Inter-granular pores, which decrease linearly with TD to about 95% TD, are effectively absent above 96% TD. Inter-granular pores allow moisture absorption in fuel pellets and the degradation of the function of the fuel during operation of a nuclear power plant. The punch geometry of the SPS can be modified to permit sintered shapes not possible by conventional sintering methods.

In an embodiment of the invention, the $UO_2$ comprising fuel pellets further comprise a material with high thermal conductivity. The highly conductive material has a thermal conductivity of at least 10 W/mK. In one embodiment of the invention, the highly thermal conductivity material is SiC. In another embodiment of the invention, the highly thermal conductivity material is carbon. The high thermal conductivity material can be included in the $UO_2$ comprising fuel pellet at levels of up to 30 vol % or more. In embodiments of the invention, the high thermally conductive material is homogeneously dispersed throughout the fuel pellet. Other highly thermally conductive materials that can be employed according to an embodiment of the invention include BeO, metals, or metal alloys, for example, a metal included as microwires or nanowires. The metal can be uranium, uranium-metal alloy, for example, uranium silicide, another metal, or another alloy, for example, a metal or metal alloy with a melting point above 1100° C. The metal can be one that does not oxidize readily on contact with $UO_2$ at elevated temperatures.

In an embodiment of the invention, $UO_2$ comprising fuel pellets can have an approximately three fold enhancement, or more, in thermal conductivity over traditional $UO_2$ fuel pellets. In an embodiment of the invention, the fuel pellets comprise 90 to 99 vol % $UO_2$ and from 1 to 10 vol % diamond particles ranging in size from 0.25 to 70 microns. The diamond particles are evenly distributed in the $UO_2$ and the fuel pellets display greater than 90% TD. $UO_2$ particles and diamond particles can be blended, for example, by ball mill with the aid of blending agent, for example, a volatile fluorocarbon liquid, prior to densification by oxidative sintering or by SPS.

Methods and Materials
Materials

Uranium dioxide powder was supplied by Los Alamos National Laboratory (Los Alamos, NM). The powder was reported to have a bulk density of 2.3 g/cm³, tap density of 2.65 g/cm³, mean particle diameter of 2.4 µm, and a BET surface area of 3.11 m²/g. The O/U ratio for the starting powder was determined to be 2.11 by measuring the weight change before and after reducing the powder into stoichiometric $UO_2$ using ASTM equilibration method (C1430-07). In contrast to conventional oxidative sintering, where hyper-stoichiometric powder $UO_{2.25}$ [$U_3O_8$+$UO_{2.11}$ in 30:70 wt. ratio] is often used no $UO_{2.25}$ was included and all sintering was performed using the as-received $UO_{2.11}$ powders.

$UO_2$ Fuel Pellets

SPS Sintering was performed using a Dr. Sinter® SPS-1030 system, where the die assembly is illustrated in FIG. 1. As-received starting powder was loaded into a graphite die of diameter 12.7 mm. The inner die surface was covered by a thin (0.13 mm) roll of graphite foil to prevent reaction of $UO_2$ with the die wall. Cylindrical graphite punches were inserted into both ends of the die. The surface of each punch that comes in contact with the powder was coated with an aerosol of graphite (ZYP Coatings, Inc., Oak Ridge, TN) for preventing undesirable reaction between the punch and the pellet as well as for easy release of the $UO_2$ pellet from the die after sintering. The die was then wrapped with a sheet of graphite felt to reduce heat loss from the graphite surface, decrease the thermal gradient between the surface of the die and the pellet, and protect the outer chamber from thermal radiation damage. A window was cut in the felt of approximately 10 mm×10 mm to allow temperature measurement on the surface of the die by using a radiation pyrometer during the sintering process.

The die assembly was placed in the sintering chamber of the SPS and the chamber was depressurized to 10 Pa. A pulsing current of 600-800 A was supplied at an on-off ratio of 12:2. The applied uniaxial pressure, temperature, z-axis motion of the punch, the chamber atmosphere pressure, current, and voltage were continually recorded as a function of time. A typical plot of some of the processing parameters during a sintering run is provided in FIG. 2. The pyrometer lower limit of detection was 600° C. and the programmed heating schedule was initiated only after the temperature of the die surface, as measured through the opening cut in the felt, reached 600° C. Above this temperature, the heating rate was programmed at either 100° C./minutes or 200° C./minutes up to a temperature of about 50° C. below a desired maximum sintering temperature, and then at 50° C./minutes up to the maximum sintering temperature of 850° C. to 1525° C. The hold time at the maximum temperature was varied between 0.5 minutes to 20 minutes for different sintering runs. No programmed pressure, a 'non-controlled' pressure, of 14 MPa to 24 MPa, was applied on the powder compact to maintain the contact between various surfaces of the assembly until a specified temperature was achieved, after which, an additional uniaxial pressure, a 'controlled' pressure, of 40 MPa was applied. Pressure and temperature were held constant for a desired time of 0.5 to 20 minutes, after which the pressure was released. During this procedure the Z-axis displacement of the punch indicates the densification of the $UO_2$ powder. A significant displacement occurs during the period when temperature rises above 600° C. The displacement then remains constant until the controlled pressure is applied. Final densification occurs upon application of the peak controlled pressure of 40 MPa immediately before achievement of the maximum sintering temperature.

After release of the controlled pressure, the chamber was allowed to cool for one hour and the graphite die and sintered compact was removed from the SPS chamber. Pellets were polished using 240 grit sandpaper, which removed residual graphite foil and aerogel on the pellets' surface. Pellets were reduced to stoichiometric $UO_2$ following the procedure described in ASTM C1430-07. Before micro-indentation hardness measurements, pellet surfaces were ground and polished using 0.05 µm colloidal silica with standard metallographic methods. Vickers hardness measurements were conducted at 200 g, 500 g, and 1 Kg applied loads for periods of 11 seconds, with at least five measurements at different locations on each pellet performed at each load. Ultrasonic measurements in both longitudinal and shear wave velocity were conducted on each pellet to determine the pellet's Young's modulus. Archimedes' method was used to determine the density of each pellet. The pellet surfaces were polished and thermally etched at 1400° C. for one hour to reveal grain boundaries. Scanning electron microscopy (SEM) was conducted to image microstructural features, using an accelerating voltage of 15 KV and electron beam current of 10-12 µA without a conductive coating on the sample's surface. Grain size was measured by the line-intercept method using ASTM E112 method covering over 100 grains in each sample.

Figure 4:
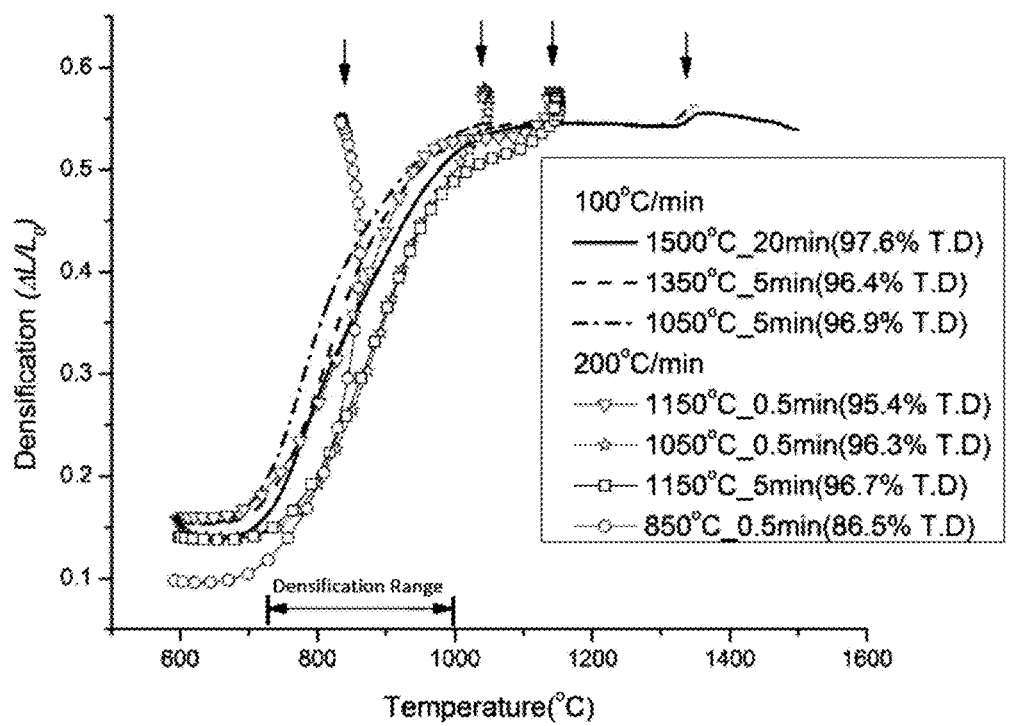
FIG. 4 shows plots of displacement for various SPS densification runs for fuel pellets consisting of $UO_2$ with different maximum temperatures and heating rates, where runs indicate increased densification rates, and where runs including imposed controlled pressure are indicated by arrows indicating where the control pressure is applied, according to an embodiment of the invention.

The densification of the pellets was measured by the reduction in the length of the green body pellet during sintering. FIG. 4 shows a few selected plots of the die surface temperature and densification, $\Delta L/L_o$, of $UO_2$ compacts for various combinations of heating rate, hold time, and maximum temperature during sintering; where $\Delta L$ is the displacement of the lower punch and $L_o$ is the original green body thickness before sintering. As revealed in FIG. 4, the densification process depends on processing conditions. In general, an s-shape profile was observed for densification in all exemplary runs with the exception of the run with a maximum temperature of 850° C. where no plateau is observed. At furnace temperatures below 720° C., only limited densification was observed. As the temperature increased through a densification range of 720 to 1000° C., a rapid increase in density was observed. Increasing the temperature beyond this range did not result in an increase in density. Further densification occurs upon the application of a controlled pressure of 40 MPa, as is apparent from the steep rise at the end of curves in FIG. 4. When the temperature was increased beyond 1350° C. a slight decrease in densification was noted, even with the controlled pressure applied, which is consistent with thermal expansion of the punch to a greater extent than is the shrinkage of the compact at these higher temperatures. Thus, for all the above cases where the maximum sintering temperature was above 1000° C., the densification behavior followed the s-shaped curve.

Figure 5:
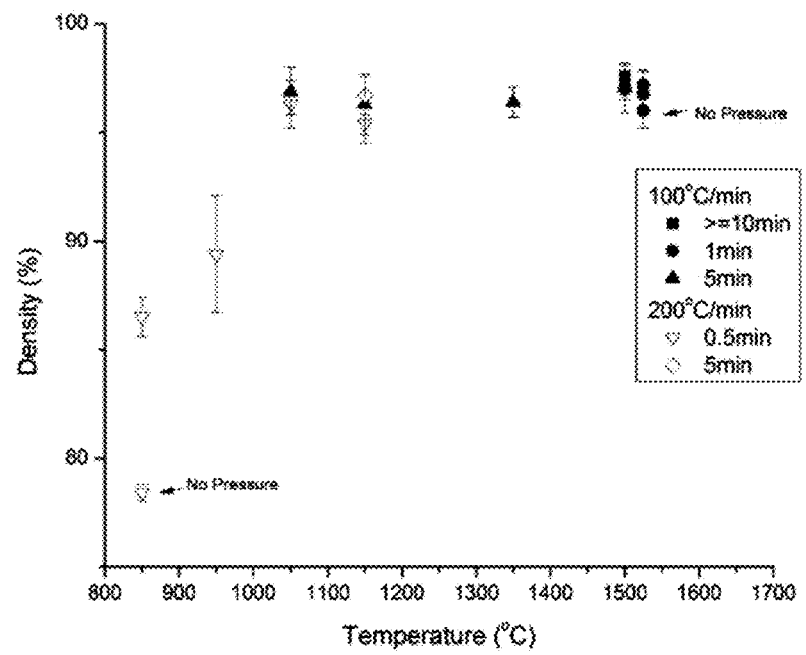
FIG. 5 shows a plot of the percent of theoretical density (TD) for SPS densification of fuel pellets consisting of $UO_2$ where runs have different maximum temperatures, heating rates, and imposed controlled pressure, according to an embodiment of the invention, with runs without the imposition of a controlled pressure indicated on the plot.
Figure 6:
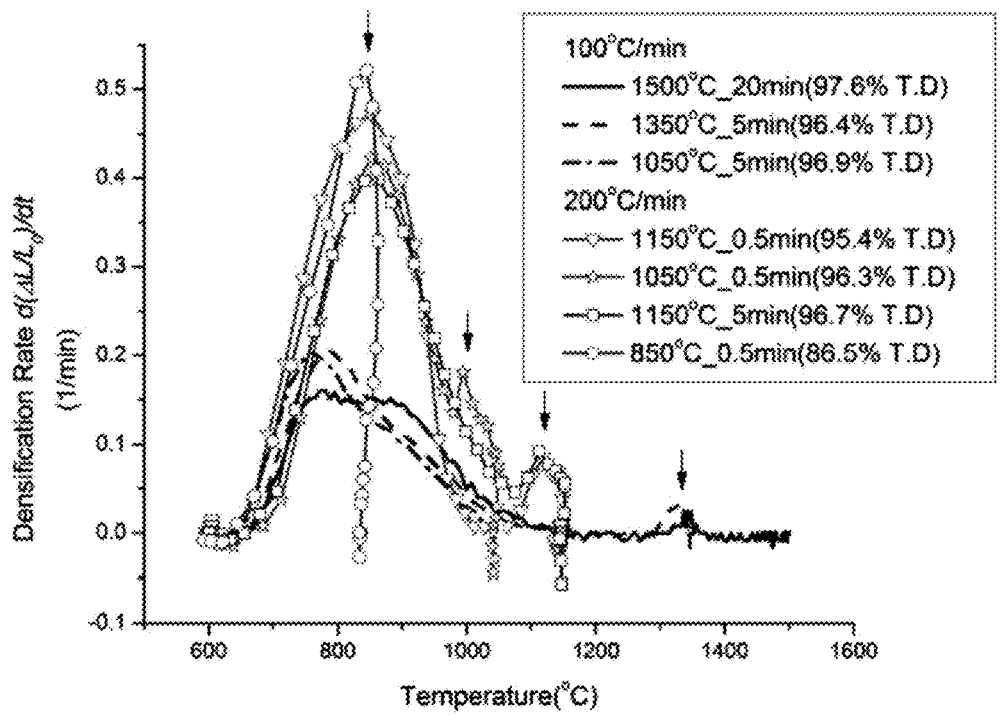
FIG. 6 shows plots of the densification rate versus temperature for various SPS densification runs with fuel pellets consisting of $UO_2$ densified to different maximum temperatures and with different heating rates, where plots show increased densification rate upon the imposition of a controlled pressure that is applied at the temperature indicated by arrows, according to an embodiment of the invention.

FIG. 5 plots final pellet density for various maximum sintering temperatures under various processing conditions. With a rapid heating rate of 200° C./minutes and the minimal hold time of 0.5 minutes at a maximum temperature of 850° C. the density achieved for the fuel pellet was 78.4% without and 86.5% with the imposition of a controlled pressure. By increasing the maximum sintering temperature and application of the controlled pressure greater fuel pellet densities were achieved, with 96.3% TD at 1050° C. with the controlled pressure. Beyond this temperature there was little variation in fuel pellet density, where densities of 97% TD to 97.6% TD were achieved at maximum sintering temperatures of 1500 to 1525° C. using a controlled pressure at temperatures above 1350° C. A fuel pellet sintered at 1525° C. without application of a controlled pressure showed a density of 97% TD. The greater effect of applying a controlled pressure at relatively low temperature, for example, 850° C., than at higher temperatures, for example, above 1350° C., suggests that the controlled pressure is most effective while particles in the powders were still undergoing particle adhesion and rearrangement, considered the first stage of sintering. In the first stage, the controlled pressure results in more particles contacting each other and neck formation between neighboring particles is facilitated. Application of the controlled pressure only at high temperature, for example, 1350° C., during the final stage of sintering where densification is primarily diffusion dependent, is nearly insignificant at promoting further densification. This is consistent with the data plotted in FIG. 6, where the densification rate as a function of surface temperature is plotted, showing a rapid rate increase above 700° C. and achievement of a rate maximum between 800 and 900° C., where having a maximum sintering temperature of only 850° C. results in the densification dropping rapidly to zero upon achievement of the maximum temperature. For higher maximum sintering temperatures, the densification rate falls gradually to zero with little effect of the maximum sintering temperature above the 'densification range' displayed in FIG. 5. Increasing the heating rate to 200° C./minutes from 100° C./minutes results in like initial densification rate, but results in a significantly larger maximum densification rate although the final density of the pellets remained nearly the same for pellets heated to the same maximum temperature. Application of controlled pressure near the end of the sintering phase results in an additional densification rate increase, as can be seen in the curves of FIG. 6. No effect on the densification rate was seen for different hold times.

Figure 7:
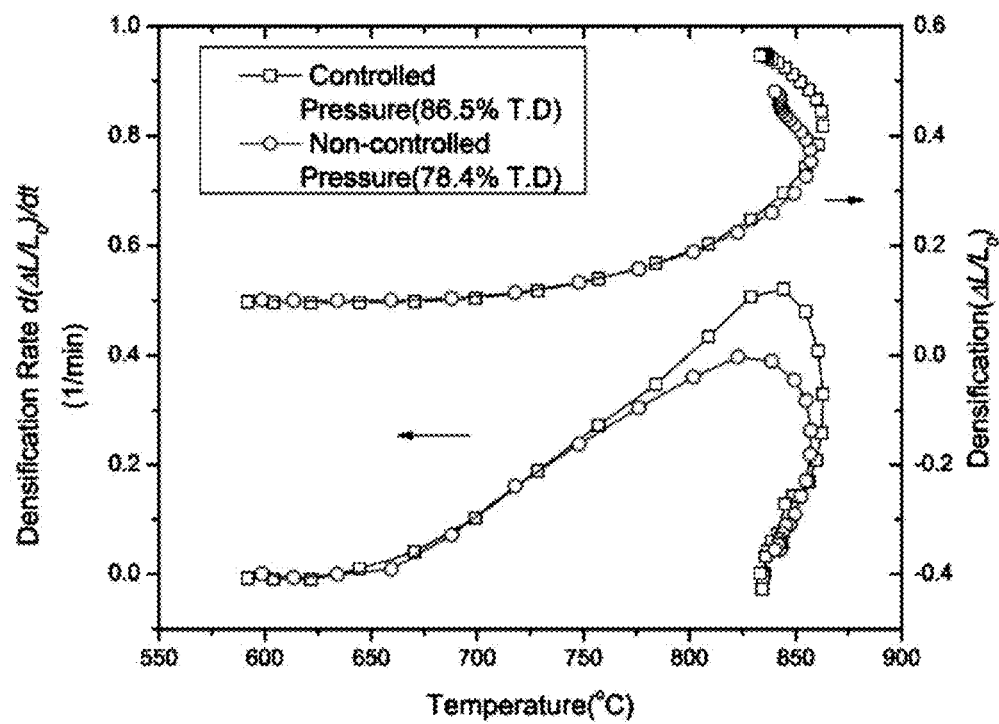
FIG. 7 shows plots of densification and densification rates versus temperature for SPS runs to produce fuel cells consisting of $UO_2$ without imposition of a controlled pressure, and with imposition of a controlled pressure, according to an embodiment of the invention.

FIG. 7 shows the effect of the controlled pressure, where densification and densification rate are plotted against surface temperature for a pellet sintered at a maximum temperature of 850° C., where $UO_2$ compact is the major densification phase with a high densification rate. In contrast to densification where no controlled pressure is applied where uniaxial pressure between 14-24 MPa occurs during the entire processing period, the controlled pressure is applied at 800° C., with a peak pressure of 40 MPa reached at 850° C. FIG. 7 reveals that without a controlled pressure (dashed line), densification increases from around 700° C. to the maximum sintering temperature and further increases during a 0.5 minutes hold time while the temperature drops to around 825° C. The densification rate curve also reveals this phenomenon. The steep drop of the curve at 850° C. indicates that densification has stopped. By applying a controlled pressure (solid line), higher densification and a higher densification rate are achieved. A final density of 86.5% is achieved by employing a controlled pressure whereas a density of only 78.4% is achieved where no controlled pressure is applied.

Sinterability of $UO_2$ is attributed to an increase in the diffusion of uranium ions at high sintering temperature under hold times of more than three hours using conventional or oxidative sintering methods. In those cases, the onset of shrinkage is observed from 800-900° C. to yield a maximum density of 96.5% theoretical density (TD) when sintering up to 1100° C. over more than three hours with an initial composition having an O to U ratio of 2.22. Using a reducing atmosphere results in a densification onset between 1100 and 1150° C., where densification over a period greater than three hours and a maximum sintering temperature of 1600° C. to attain 90% TD. In contrast, according to an embodiment of the invention, densification starts at a temperature of as little as 720° C. with densification up to 96.3% TD at 1050° C. with a total run time of 10 minutes with a hold time of 0.5 minutes at the maximum temperature, as shown in FIG. 5. This result implies that diffusion of uranium is not a major factor in densification because the entire sintering cycle was only 10 minutes and the period above 720° C. is only about four minutes, which is consistent with the uniaxial pressure and the pulsed current being the key factors favoring rapid densification. The pulsed current contributes to the densification with a microscopic discharge occurring at the surfaces of the particles to promote densification.

Figures 8A, 8B:
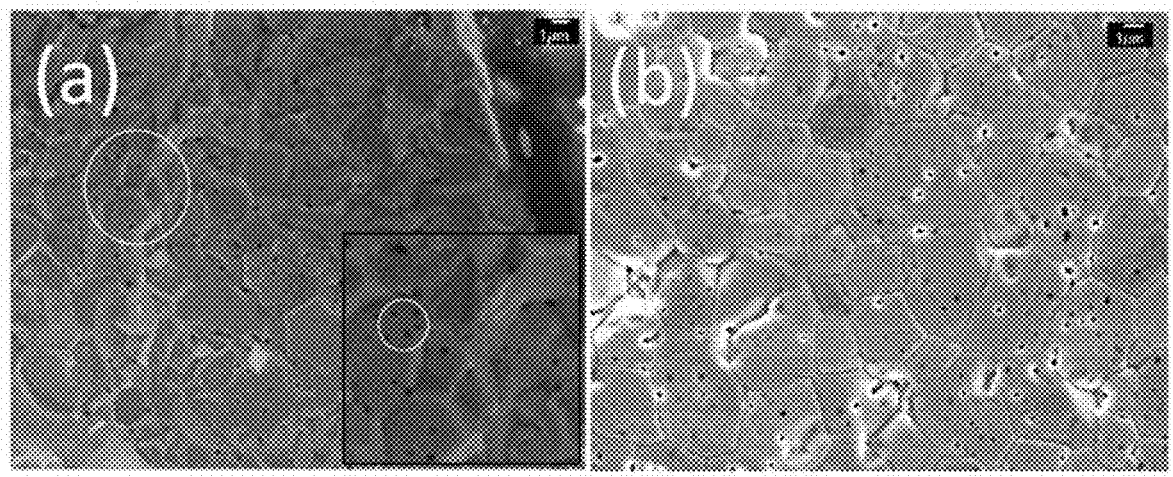
FIGS. 8A and 8B show SEM micrographs of sintered SPS prepared fuel pellets consisting of $UO_2$ where the sintering maximum temperature is 1150° C. with a controlled pressure held for five minutes achieving a 96.3% TD, where

The microstructure of a pellet sintered at 1150° C. for five minutes is shown in FIGS. 8A and 8B, where FIG. 8A shows the fracture surface and FIG. 8B reveals the polished surface after thermal etching at 1400° C. for 30 minutes, where both micrographs reveal significant inter- and intra-granular pores. The density of the pellet was 96.3% TD and the average grain size was 2.9±0.3 Limited grain growth occurred during the SPS, primarily due to the rapid heating rate and short hold time. Because of rapid heating, coarsening during the lower temperature range, below 700° C., is bypassed rapidly and the densification occurs during the very short time at temperatures above 700° C. FIGS. 8A and 8B reveal a large number of intra-granular pores. Unlike traditional sintering processes where intra-granular pores are attributed to over sintering when high temperatures and/or long sintering times are employed, where inter-granular pores break from grain boundaries and migrate to the interior of the grains rendering them difficult to eliminate due to a low lattice diffusion rate. This is not the case for fuel pellets, according to an embodiment of the invention, as the SPS process is unlikely to permit over-sintering at low temperatures in the short sintering times. In the SPS process the high heating rate and application of the uniaxial pressure at the peak sintering temperature may promote neck formation along the inter-particle contacts and closed pores form from gas trapped between the particles. It is seen in FIG. 5 that the maximum density was 97%, with the remaining 3% porosity being primarily intra-granular porosity.

Figure 9:
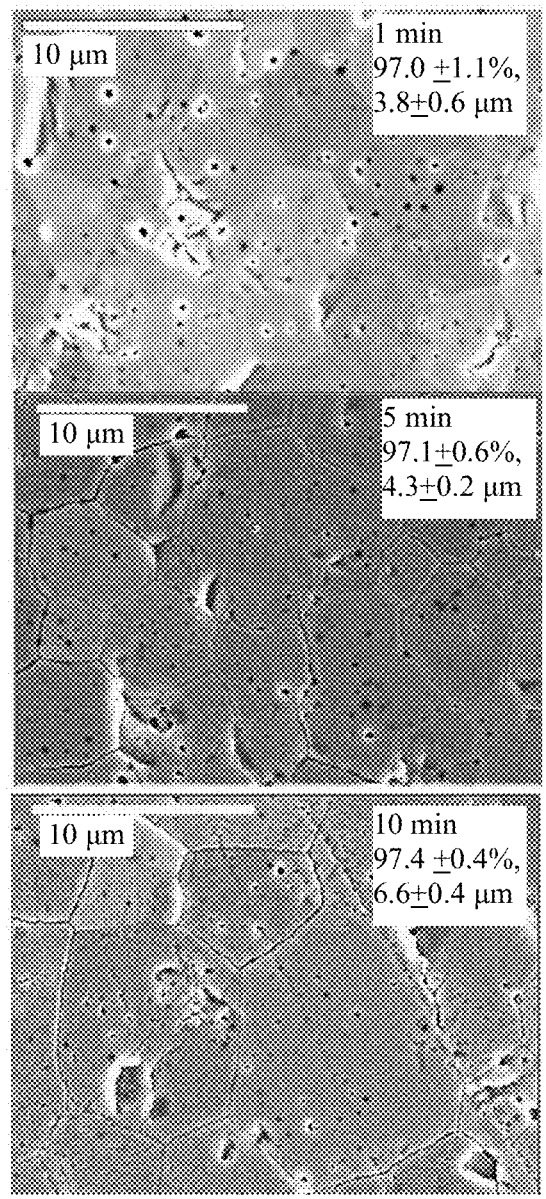
FIG. 9 shows SEM micrographs of surfaces of fuel cells consisting of $UO_2$ prepared by SPS which show the grain grow for various isothermal hold times, as indicated on each micrograph with the resulting relative density and average grain size, according to an embodiment of the invention.
Figure 10:
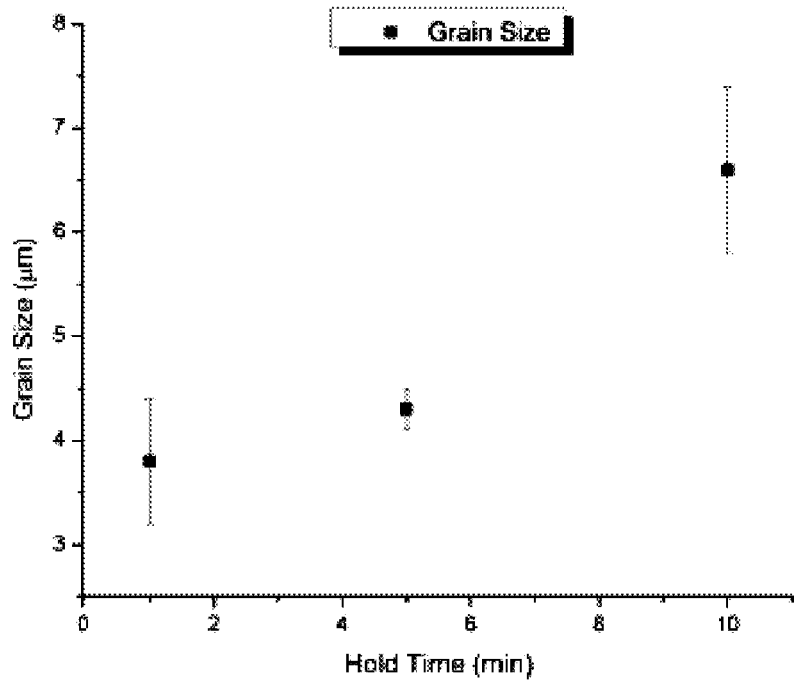
FIG. 10 shows a plot of the average grain size versus hold time for three different fuel pellets consisting of $UO_2$ having similar densities of about 97% TD, according to an embodiment of the invention.

Although the hold time has little effect on densification, grain growth during the hold time can be significant. Isothermal grain growth of $UO_2$ at 1500° C. is shown in FIG. 9 for various hold times. The average grain size increased with hold time for a given temperature, where a hold time of five minutes resulted in a grain size increase of 13% over a pellet that has a hold time of one minute. Increasing the hold time to ten minutes results in a 53% increase in grain size over the pellet with a hold time of five minutes as is plotted in FIG. 10. As can be seen in FIG. 9, a considerable reduction in pores and pore-densities accompanies the increase in grain size, even though the increase in density over a 10 minutes period is not significant.

Figure 11:
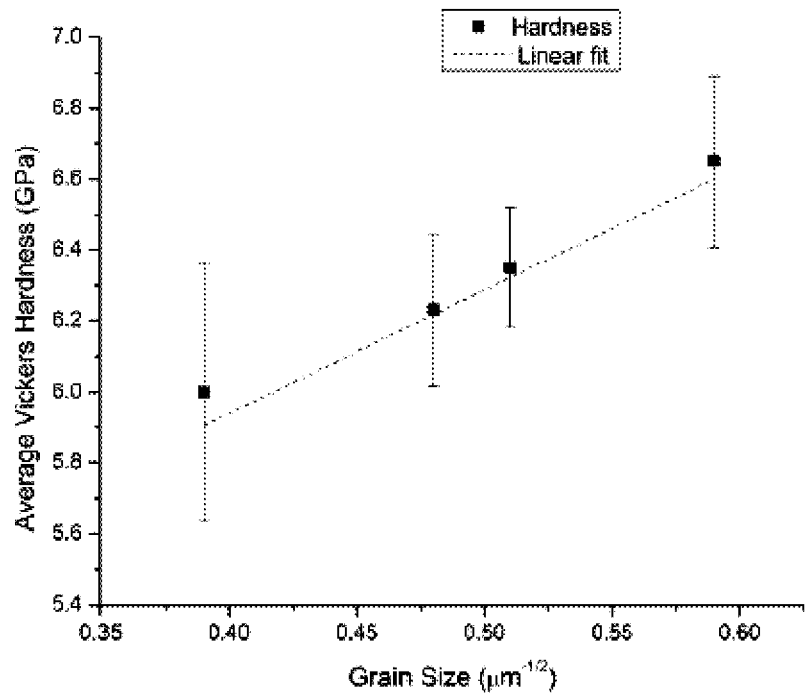
FIG. 11 shows a plot of Vickers Hardness versus average grain size that displays a Hall-Petch relationship for fuel pellets consisting of $UO_2$, according to an embodiment of the invention, using different loads of 0.2, 0.5 and 1 kg while measuring the hardness.

FIG. 11 shows Vickers hardness versus the inverse average grain size. The hardness values increased with decrease in the grain size by the Hall-Petch relation. The average hardness value was around 6.4±0.4 GPa. The Young's modulus E and Poisson's ratio v were determined using ultrasonic measurement. The correlation between the longitudinal velocity ($V_L$), shear velocity ($V_S$), and density ($\rho$) are given by Equations 1 and 2, below:

$$v = \frac{1 - 2(V_s/V_L)^2}{2 - 2(V_s/V_L)^2} \qquad (1)$$

$$E = \frac{V_L^2 \rho (1+v)(1-2v)}{1-v}. \qquad (2)$$

Figure 12:
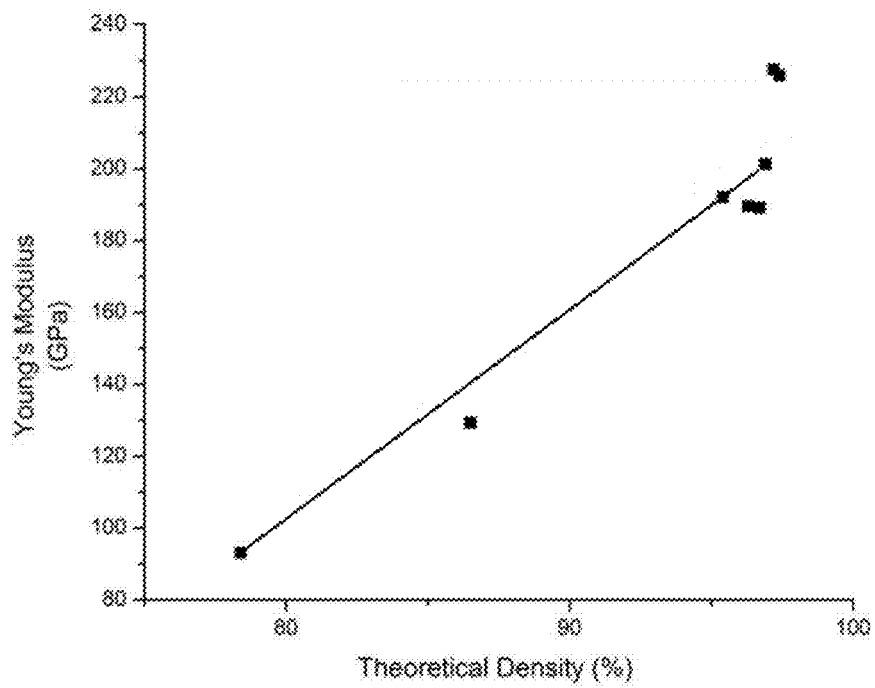
FIG. 12 shows a plot of the Young's modulus for various densities for fuel pellets consisting of $UO_2$, according to an embodiment of the invention.

The Young's modulus was calculated using equations (1) and (2) and the values are plotted in FIG. 12, which revealed a linear relationship between the Young's modulus and the relative density of the pellets. The average Young's modulus for pellets of density above 95% is around 204±18 GPa.

Additional $UO_2$ Pellet Studies

Uranium dioxide powder was supplied by Areva Fuel System, Hanford, WA. The powder was reported to have a bulk density of 2.3 g/cm$^3$, tap density of 2.65 g/cm$^3$, mean particle diameter of 2.4 μm, and a BET surface area of 3.11 m$^2$/g. The grain size was determined using high resolution SEM to be around 100-400 nm. The O/U ratio for the starting powder was determined to be $UO_{2.16}$ by measuring the weight change before and after reducing the powder to stoichiometric $UO_2$ using ASTM equilibration method (C1430-07).

Sintering was performed using a Dr. Sinter® SPS-1030 system. The starting powder was loaded into a 12.5 mm inner diameter graphite die and placed in the sintering chamber of the SPS which was depressurized to 10 Pa. A pyrometer was used for monitoring the actual temperature of the die surface during the sintering process. Two heating rates of 50 and 200° C./minutes were used and a uniaxial pressure of 40 MPa was applied when the maximum sintering temperature was reached and held for desired duration of time. The maximum sintering temperature was varied from 750 to 1450° C. and the hold time was varied from 0.5 minutes to 20 minutes to achieve different grain sizes in the microstructures.

After sintering, most the sintered pellets were reduced into $UO_{2.00}$ in a furnace at 800° C. for 6 hours, in a 4% $H_2$—$N_2$ gas, with a water vapor atmosphere using a water bath maintained at 35° C. The O/U ratio of the resulting pellets was estimated by measuring the weight change before and after the reduction process. The density of the reduced pellets was measured using the Archimedes method by immersing the pellets into the distilled water. X-ray Diffraction (XRD, Philips APD 3720) was conducted to detect the possible formation of intermetallics after sintering. A field emission scanning electron microscopy was conducted to image microstructural features. Grain size was measured from several micrographs using the line intercept method and observation of the fracture surface in SEM.

Thermal conductivity measurement was calculated using the relationship $k=C_p \rho \alpha$, where k is the thermal conductivity (W/m·K), $C_p$ is the constant-pressure specific heat (J/kg·K). $\rho$ (g/cm$^3$) is density and $\alpha$ (cm$^2$/s) is thermal diffusivity. The thermal diffusivity was measured at three temperatures, 100° C., 500° C. and 900° C. under $N_2$ atmosphere using laser flash method (Anter Flashline 3000). Before measurement, the sintered pellets were sectioned into disks of thickness of 3 mm. Both surfaces of the disks were coated with the colloidal graphite spray to ensure constant heat absorption during the measurement. The laser flash method utilizes xenon pulse shot to generate heat on the front surface of the disc specimen and the temperature rise on the rear surface is recorded. The thermal diffusivity ($\alpha$) is calculated by measuring the specimen thickness (L) and the time ($t_{0.5}$) for the temperature of the rear face of the disk to rise to the half of its maximum value $$\left(\alpha = \frac{1.38L^2}{\pi t_{0.5}}\right).$$

Due to the difficulty to directly measure the specific heat, the theoretical specific heat for $UO_2$ is used for the calculation, which is 258 (J/kg·K), 305 (J/kg·K) and 314 (J/kg·K) for 100° C., 500° C. and 900° C., respectively.

Density and Grain Size

Figure 13:
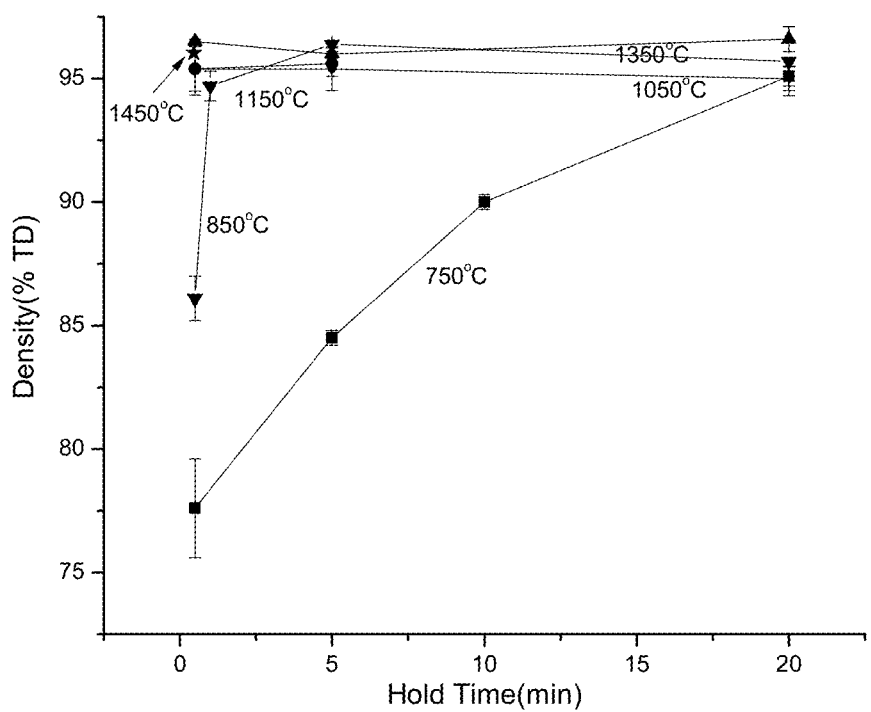
FIG. 13 shows a plot density of sintered $UO_2$ pellets at different maximum sintering temperatures for various hold times, according to an embodiment of the invention.

The influence of hold time at different maximum sintering temperatures on the density of the sintered pellets is plotted in FIG. 13. Below 95% TD, densification can be enhanced either by increasing the maximum sintering temperature or hold time. At 750° C., the pellet density is only 76% TD when the hold time is 0.5 min. By increasing the hold time to 20 min, the TD increased to 95%. In addition, the density can also be increased to 96% by increasing temperature to 1050° C. with only 0.5 minute hold time. Thus, one can increase the density of pellet either by increasing the hold time at a lower sintering temperature or by increasing the temperature but for shorter hold time. However, after reaching 95% TD, increasing neither the maximum sintering temperature nor hold time may result in further significant densification. As a result, all the densities achieved in this study are below 98% TD.

Figure 14:
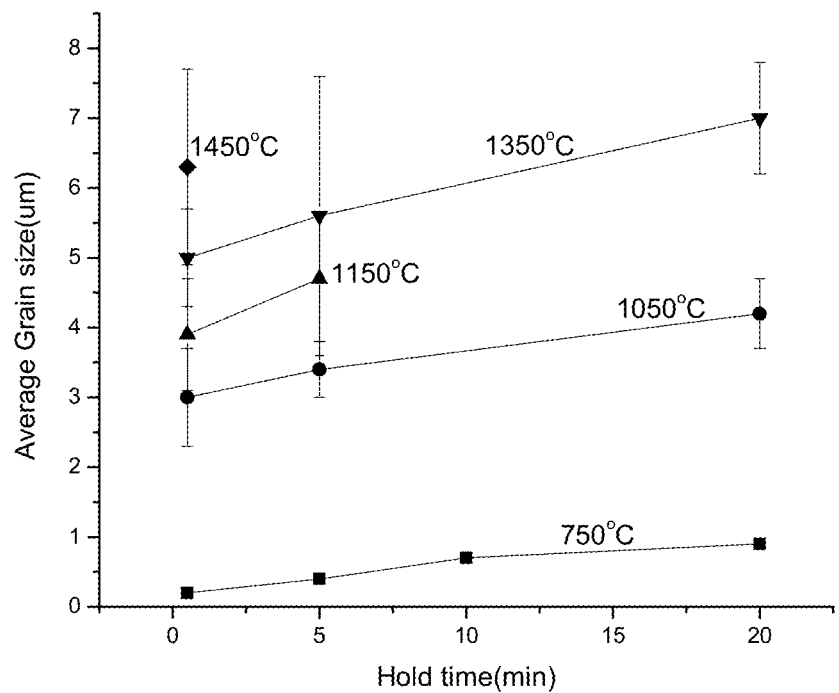
FIG. 14 shows a plot of the average grain size of the sintered $UO_2$ pellets for various hold times and maximum sintering temperatures, according to an embodiment of the invention.

The influence of hold time and maximum sintering temperature on grain size is plotted in FIG. 14. At 750° C. with a hold time of 0.5 minute, the resulting average grain size is only 0.2 μm which is the same as that of the starting powder (0.1-0.4 μm). Even after increasing the hold time to 20 minutes at this temperature, the average grain size is increased to only 0.9 μm. On the other hand, by increasing the maximum sintering temperature to 1050° C. for 0.5 minute hold time, the grain size increases to 3 μm and with further increase in maximum sintering temperature to 1450° C., the grain size increased significantly to 6.3 μm with a hold time of only 0.5 minute. At a slightly lower temperature of 1350° C., the maximum grain size of 7 μm was achieved with a hold time of 20 minutes. At a given maximum sintering temperature, increase in hold time has marginal effect on grain size. But for a given hold time, increase in sintering temperature has dramatic effect. Further increase in maximum sintering temperature beyond 1450° C. causes large cracks and eventual crumbling of pellets. The details of processing conditions and the resulting density and grain size of the pellets are provided in Table 1, below.

Figure 15:
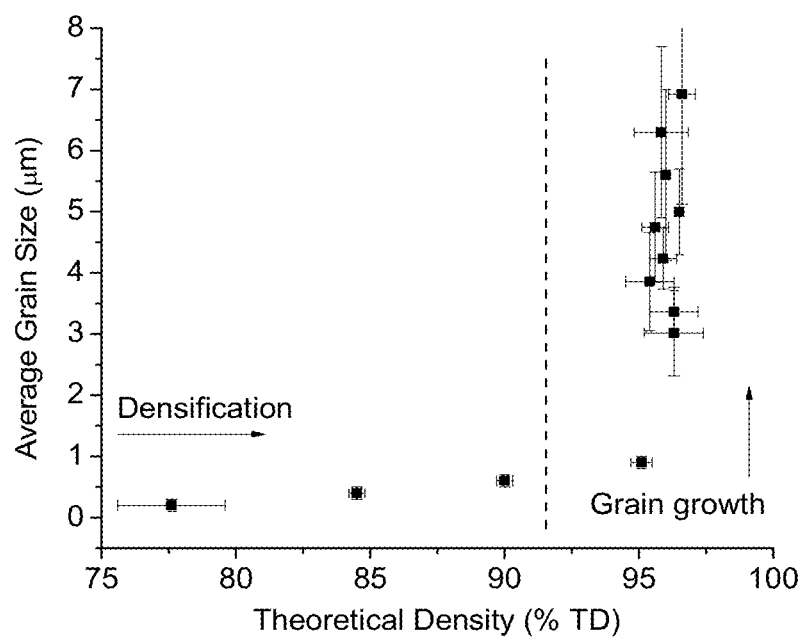
FIG. 15 shows a plot for the evolution of average grain size versus the theoretical density of the samples sintered using heating rate of 200° C./minute where at about a TD of 95% grain size increases only marginally, according to an embodiment of the invention.

The correlation between the grain size and the density of the sintered $UO_2$ pellets for all the sintering runs with different hold times and maximum sintering temperatures is plotted in FIG. 15. The grain size of $UO_2$ appears to be a function of the pellet density regardless of the hold time and maximum sintering temperature. The curve implies that during the early stage of densification until around 90%, there is almost no grain growth. The average grain size remains below 0.6 μm until the theoretical density reaches 90% and it increases to 0.9 μm at 95% TD. Beyond this TD, the grain size increases dramatically to 3 μm while there is only a slight increase in the TD. The grain size reaches to almost 7 μm when the density reaches close to 97% TD.

TABLE 1

SPS processing parameters and the resulting properties of $UO_2$ pellets

| Max. Temp. (C.) | Heating rate (° C./min) | Hold time (min) | TD (%) | Grain size (μm) |
|---|---|---|---|---|
| 750 | 200 | 0.5 | 77.6 +/− 2.0 | 0.2 +/− 0.1 |
| | | 5 | 84.5 +/− 0.3 | 0.4 +/− 0.1 |
| | | 10 | 90.0 +/− 0.3 | 0.6 +/− 0.1 |
| | | 20 | 95.1 +/− 0.4 | 0.9 +/− 0.1 |
| 850 | | 0.5 | 86.1 +/− 0.9 | n/a |
| | | 1 | 94.7 +/− 0.6 | n/a |
| | | 5 | 96.4 +/− 0.1 | n/a |
| | | 20 | 95.7 +/− 1.4 | 2 +/− 0.5 |
| 1050 | | 0.5 | 96.3 +/− 1.1 | 3.0 +/− 0.7 |
| | | 5 | 96.3 +/− 0.9 | 3.4 +/− 0.4 |
| | | 20 | 95.9 +/− 0.5 | 4.2 +/− 0.5 |
| 1150 | | 0.5 | 95.4 +/− 0.9 | 3.9 +/− 0.8 |
| | | 5 | 95.6 +/− 0.5 | 4.7 +/− 0.9 |
| 1350 | | 0.5 | 96.5 +/− 0.1 | 5.0 +/− 0.7 |
| | | 5 | 96.0 +/− 0.1 | 5.6 +/− 1.4 |
| | | 20 | 96.6 +/− 0.5 | 6.9 +/− 1.8 |
| 1450 | | 0.5 | 95.8 +/− 1.0 | 6.3 +/− 1.4 |
| 850 | 50 | 20 | 96.9 +/− 0.2 | 2.5 +/− 0.8 |
| 1350 | | | 96.9 +/− 1.0 | 8.9 +/− 1.4 |

O/U Ratio

Figure 16:
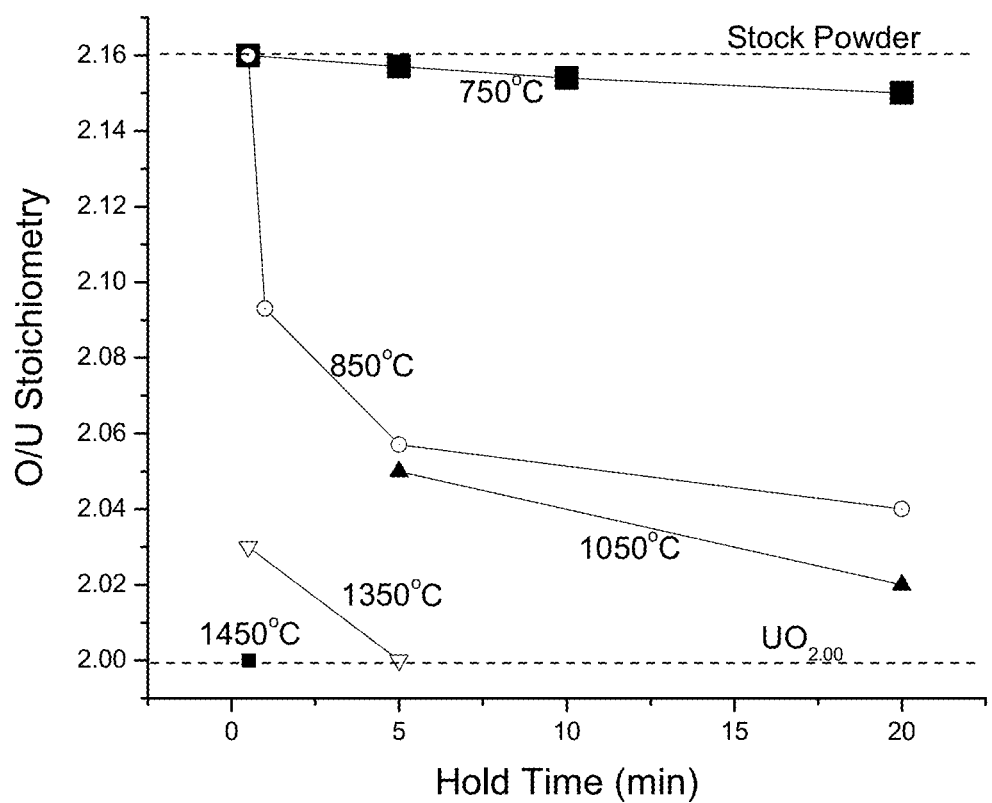
FIG. 16 shows the effect of hold time and maximum sintering temperature on the resulting O/U ratio of the sintered pellets, according to an embodiment of the invention.

Although the starting O/U ratio of the $UO_2$ powder was 2.16, depending on the process conditions, the O/U ratio in the sintered pellet varied. As seen in FIG. 16, the O/U ratio decreased moderately with increasing the hold time but more severely with the maximum sintering temperature. At low sintering temperature of 750° C., only moderate decrease of O/U ratio is revealed when extending the hold time from 0.5 to 20 minutes. However, with the increase in the maximum sintering temperature to 850° C., the O/U ratio dropped more rapidly, and at 1450° C., only 0.5 minute hold time was needed for O/U ratio to reach the desired 2.00. No further decrease in O/U ratio was observed in the range of processing conditions. Chemical reaction occurs during sintering to reduce the oxygen level in the powder.

Thermal Diffusivity and Conductivity

Figure 17:
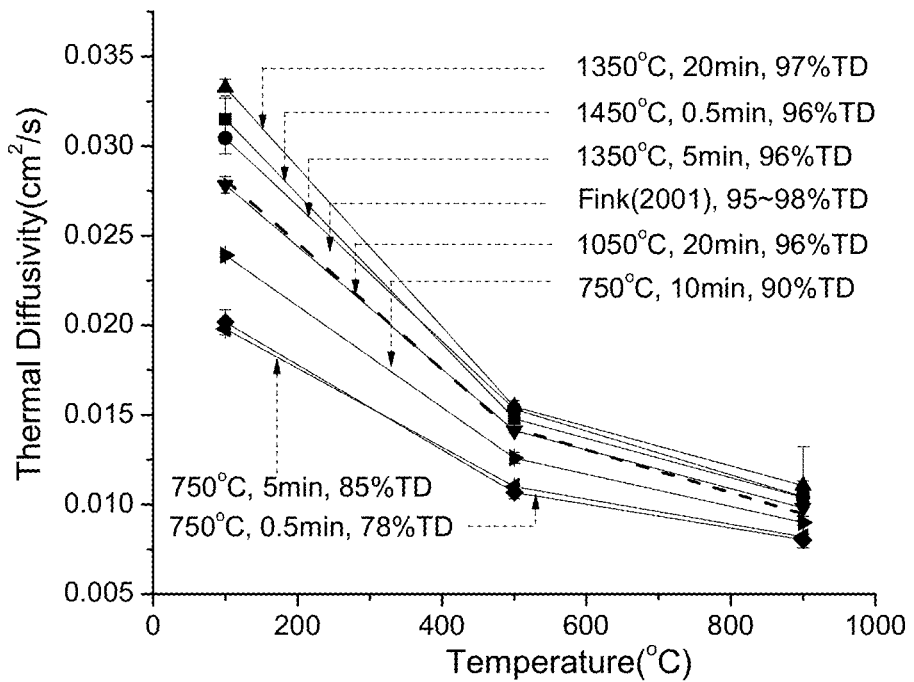
FIG. 17 is a plot of the thermal diffusivity of pellets at 100° C., 500° C. and 900° C. for pellets processed according to an embodiment of the invention for the maximum temperature, hold time and TD indicated.
Figure 18:
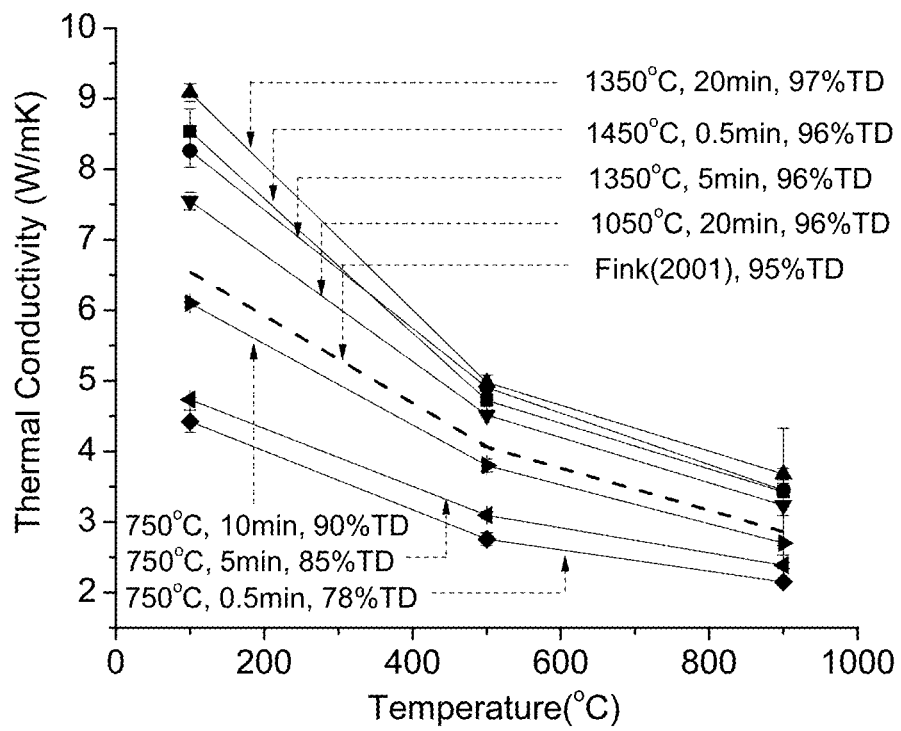
FIG. 18 is a plot of the thermal conductivities of pellets at 100° C., 500° C. and 900° C. for pellets processed according to an embodiment of the invention for the maximum temperature, hold time and TD indicated.

Thermal diffusivity data for the sintered samples are plotted in FIG. 17 at three different temperatures. For all the pellets, thermal diffusivity decreases when the operating temperature increases. However, significant difference is seen among the samples with different processing conditions at each operating temperature. The pellets prepared at 750° C. with a hold times of 0.5 and 5 minutes have the lowest values of only 0.02 cm$^2$/s at 100° C. while the one sintered at 1350° C. for 20 minutes hold time showed a diffusivity of 0.033 cm$^2$/s, an increase of 65%. However, with the increase in temperature, this difference tended to decrease. At 900° C., the lowest diffusivity is 0.008 cm$^2$/s and the highest value is 0.011 cm$^2$/s, an increase of only 38%. Using the diffusivity values presented in FIG. 17, we calculated thermal conductivity and plotted the value in FIG. 18 as a function of temperature. The thermal conductivity versus temperature reveals a trend similar to that of diffusivity in FIG. 17. The specific heat used in the calculation was obtained from J. K. Fink, *Journal of Nuclear Materials*, 279 (2000) 1-18. As seen in FIG. 17 and FIG. 18, higher sintering temperature and longer hold time are advantageous to produce high thermal diffusivity and conductivity.

Microstructure Development

Figure 19:
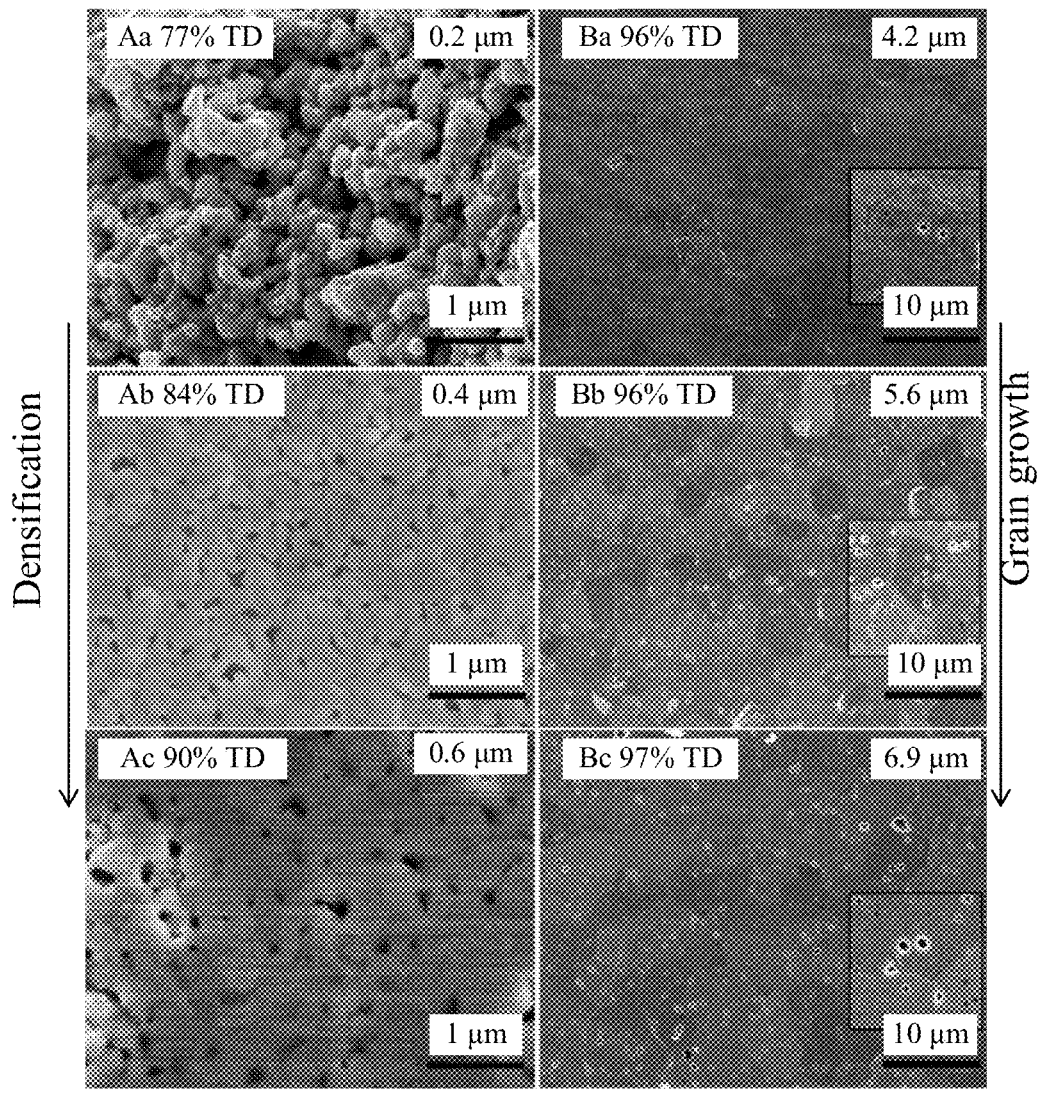
FIG. 19 shows SEM image of the selected $UO_2$ pellets, according to embodiments of the invention where: Aa-Ac are the pellets in the densification region with the similar grain size of around 0.4 μm; Ba-Bc are from the grain growth region with the similar density of around 96~97% TD; and where Aa is a fracture surface and the remaining are polished and thermally etched surfaces.
Figure 20:
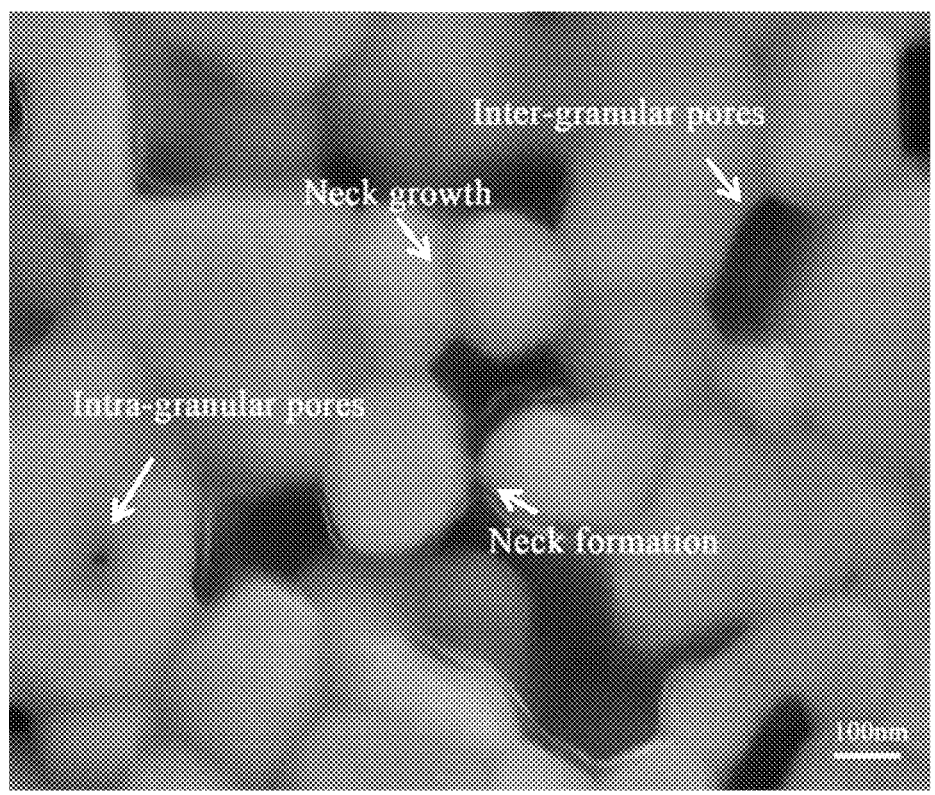
FIG. 20 is a SEM image revealing formation of intragranular pores during densification for a pellet of 77% TD, where the arrows indicate the steps that result in the intragranular pores.

The final microstructure in the sintered pellet is a function of the level of densification and grain growth behavior during the sintering process. As shown in FIG. 15, the grain size is only a function of the density regardless of the hold time and maximum sintering temperature. The delay in the grain growth until 95% TD is reached, as shown in FIG. 15, may be due to the pinning effect of the inter-granular pores present in the grain boundaries as revealed in FIG. 19 (Aa, Ab, and Ac), where the micrographs in the left column show the microstructure of constant grain size of about 0.4 µm but the TD values from 77% to 90%. Large portions of the porosity are clearly seen at these low densities in FIG. 19 (Aa-Ac). The pores surrounding each grain inhibit the grain boundary migration, thus limiting the densification process. With increasing temperature or hold time, the densification continues where most pores shrink and close due to the grain boundary diffusion. Some pores remain attached to the grain boundary with grain boundary migration. Only a small portion of the pores are left within the grain, forming intra-granular pores as shown in FIG. 19 (Ba-Bc). As the grain size continues to increase, the density remains almost constant at 96-97% TD. The residual porosity now mainly consisted of intra-granular porosity as seen in the high-magnification images on the right column of FIG. 19. The elimination of intra-granular porosity is possible by lattice diffusion which requires longer processing time. Thus, the presence of intra-granular porosity limits the final density of UO$_2$ to 97% TD under the current processing conditions. The formation of intra-granular porosity during densification can be clearly observed in FIG. 20 where the high magnification SEM image of a pellet sintered at 750° C. and the density is 77% is shown. As indicated by the arrows in the image, various sequences of mechanisms which are operative during grain growth and subsequent densification are shown in this figure. Initially, neck formation occurs between two grains. With the surrounding grains forming similar necks simultaneously, grain growth occurs and inter-granular pores were formed. As the densification and grain growth-induced grain boundary migration continues, some pores shrank and closed while some others separated from the grain boundaries and were left inside the grain, forming intra-granular pores as revealed in the figure. The relationship between grain size and densification, as shown in FIG. 15 results because during the early stage, the starting powder particles cannot grow into large grains as they are farther apart but with increase in pressure and temperature, the grains are close and start to merge due to neck formation. This process eventually reduces porosity and allows densification to occur with simultaneous grain growth, as illustrated in FIG. 15. The ability to fabricate pellets with controlled intra-granular porosity is of significant value when these pellets are in a reactor. Fission gas release can be dropped effectively in these intra-granular pores, whereas inter-granular pores permit the fission gas trapped in these pores to cause pellet cracking. Thus, SPS offers the benefit of control of porosity in the UO$_2$ pellet.

Reduction of O/U Ratio during SPS

Figure 21:
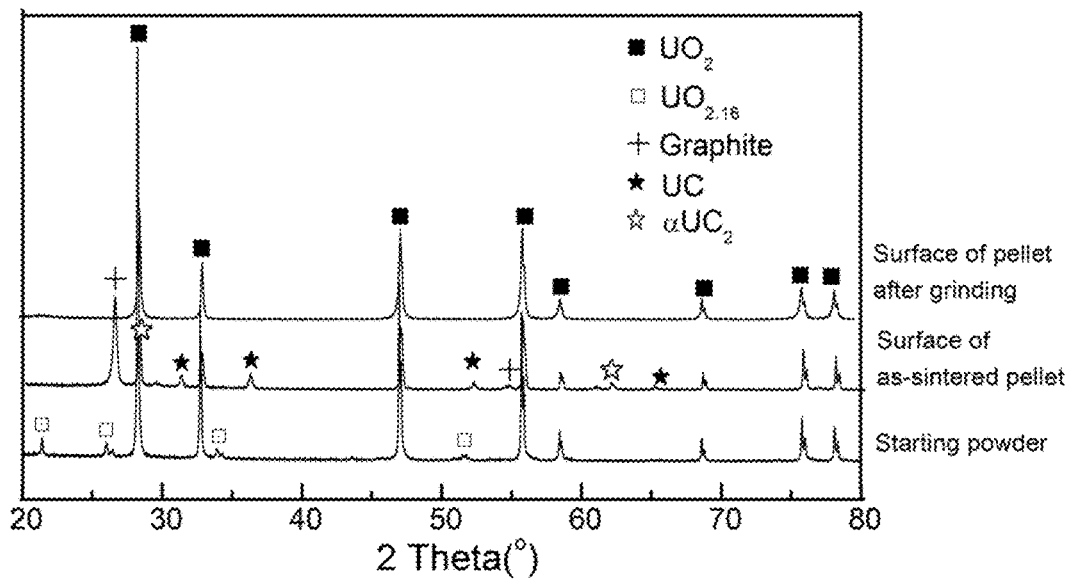
FIG. 21 shows overlaid XRD peaks for starting powder, as-sintered pellet surface and pellet after surface grinding to remove the surface layer, according to an embodiment of the invention.

Stoichiometry of UO$_2$ plays a critical role in pellet physical and thermo-mechanical properties such as grain size, creep resistance and thermal conductivity. A slight deviation in the oxygen/uranium (O/U) ratio from 2.00 can result in significant decrease in thermal conductivity. For efficient operation of UO$_2$, the O/U ratio of 2.00 must be maintained in pellet after the fabrication in reactor environment. To maintain this optimal O/U ratio, each sintered pellet can be reduced in a H$_2$ atmosphere. In a conventional oxidative sintering (which takes almost 24 hours), the pellet O/U ratio after sintering is around 2.25. This is because this hyper-stoichiometry may enhance sinterability of UO$_2$. However, the oxidative sintering results in hyperstoichiometric UO$_2$ pellet which requires subsequent post-sintering reduction in H$_2$ atmosphere as per ASTM(C1430-07). FIG. 16 shows that after SPS, the pellets revealed an O/U ratio lower than that of the starting powder UO$_{2.16}$. Additionally, it is noted that, at a maximum sintering temperature of 1350° C. and a hold time of 5 minutes, the O/U ratio of 2.00 is achieved, with no need for reduction. By establishing appropriate processing conditions, UO$_2$ powder can be reduced into the stoichiometric form of UO$_{2.00}$ without any need for post-sintering reduction step in H$_2$ atmosphere. The reduction of UO$_2$ may occur from the chemical reaction between graphite punch/die and the powder. As shown in FIG. 21, the XRD curve of the as-sintered pellet at 1450° C. and 0.5 minute hold time revealed the formation of uranium carbide on the surface. However, after hand-grinding the surface layer on each pellet with 400 grit SiC paper for 1-2 minutes, only UO$_2$ peaks were detected. Hence, a layer of reaction product between punch/die and UO$_2$ powder is formed on the surface of the pellet. Based on the U—C—O phase diagram at 1000° C., the following reactions are possible in the generated intermetallic surface layer.

$$UO_{2+x} + xC \rightarrow UO_2 + xCO \qquad (3)$$

$$UO_2 + 4C \rightarrow UC_2 + 2CO \qquad (4)$$

$$UC_2 + UO_2 \rightarrow 4UC + 2CO \qquad (5)$$

Figure 22:
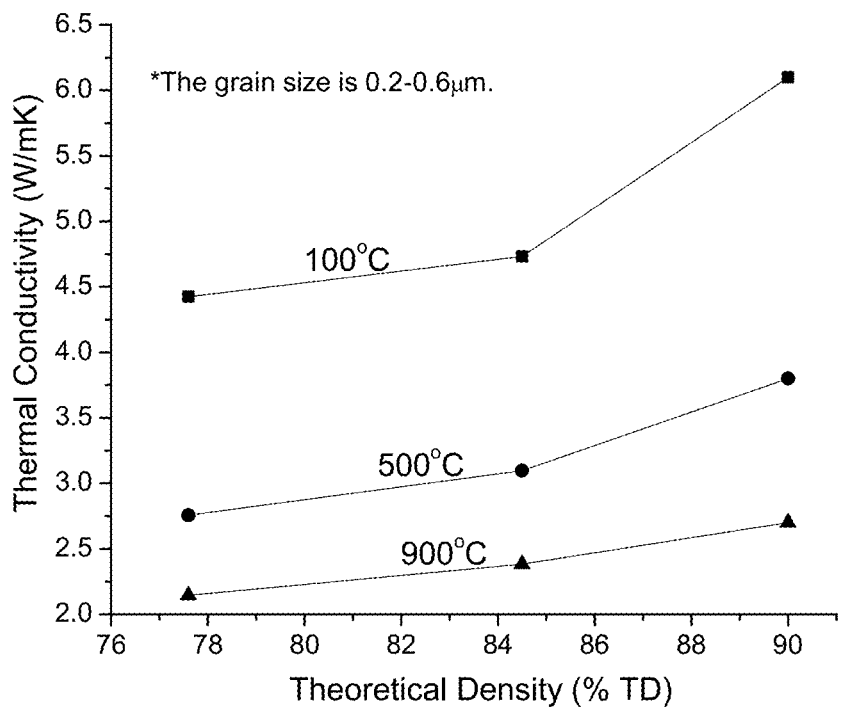
FIG. 22 shows plots of thermal conductivity of the low-density (<90% TD) pellets at the temperatures of 100° C., 500° C. and 900° C. where a significant increase in thermal conductivity with increasing density occurs and is most pronounced at low temperature.

Therefore by removing the surface reaction layer, a pellet with a desired UO$_{2.00}$ is achieved. Influence of density and grain size on thermal conductivity As shown in FIG. 15, there are two distinct mechanisms that are operative during the sintering process: densification dominated below 90% TD and grain growth dominated between 96~97% TD. Thus, the pellets with the same grain size in the densification phase are chosen to study the influence of density on thermal conductivity. As seen in FIG. 22, the thermal conductivity is increased with increase in density at all three operating temperatures. The heat transport in $UO_2$ is generally through the lattice phonon-phonon scattering at the low temperature (<1700° C.). The existence of porosity in the structure and the gas-solid interfaces, as well as the poor thermal conductivity of the gas inside the pores, prevents the heat transfer efficiency in low-density $UO_2$. Temperature is another important factor influencing the thermal conductivity in $UO_2$. With the increase in temperature, the mean free path of phonon is decreased and phonon-phonon scattering is further disturbed, leading to further reduction of resulting thermal conductivity.

Figure 23:
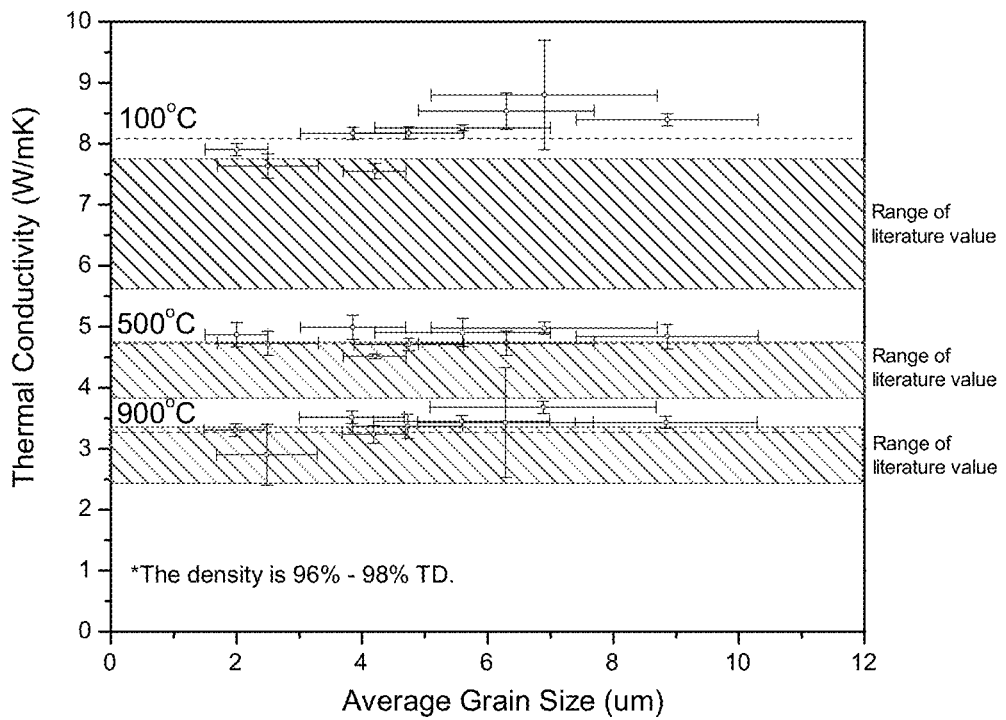
FIG. 23 is a plot of thermal conductivities of high density (96%-98% TD) pellets versus the average grain size at the temperatures of 100° C., 500° C. and 900° C. where a dashed lines indicates the average value of thermal conductivity of all samples prepared according to an embodiment of the invention and shaded areas indicate the breadth of literature values for conventionally sintered $UO_2$ pellets.

The correlation between grain size and thermal conductivity for all the pellets is plotted in FIG. 23. In order to get a more comprehensive understanding of the influence of grain size, additional SPS runs with slower heating rate (50° C./min) have been conducted and the processing conditions for these pellets are also listed in Table 1. As seen in FIG. 23, by varying the grain size from 2 to 9 no significant difference in thermal conductivity was noted at all the three temperatures. Although the smallest grain size in this study is only 2 compared with 10-15 µm in conventional sintering methods, there is only slight decrease in thermal conductivity at 100° C. when the grain size is less than 4.5 µm and no influence of grain size is revealed at 500° C. and 900° C. The dependence of thermal conductivity on grain size stems from the interfacial resistance, which is measured in terms of Kapitza length. When the grain size is smaller than or comparable to Kapitza length which is ~100 nm at 100° C. for $UO_2$, the grain itself offers the same thermal resistance as the interface. Thus, the thermal conductivity is mainly dominated by grain sizes in this regime. Further decrease of the grain size may strongly decrease the thermal conductivity. On the other hand, when the grain size is larger than the magnitude of Kapitza length, the effect of the grain size is only due to the interfacial resistance at the grain boundaries. With larger grain size, there is less volume of grain boundaries that can act as the barrier to prevent the heat transport. Thus, higher thermal conductivity is expected for larger grain size. In our case, the typical grain size is more than 10 times larger than Kapitza length, which indicates that the increase in thermal conductivity is mainly due to the decreased volume of grain boundaries, however, only marginal increase of thermal conductivity of $UO_2$ when the grain size is larger than 1 µm at 300 K. This conclusion is in agreement with the result presented in our study. The average values of thermal conductivity for these pellets, 8.2 (W/mK), 4.7 (W/mK) and 3.4 (W/mK), at three operating temperatures are indicated by dashed lines in FIG. 23, which is near the maximum values reported in the literature for conventionally sintered $UO_2$ pellets, indicated by the shaded areas in FIG. 23. The average thermal conductivities for samples with average grain sizes above 4.5 µm are higher than the maximum of that reported for conventional sintering.

The advantages of SPS over conventional sintering is summarized in Table 2, below. These features are expected to yield significant economic benefit if large scale manufacturing using SPS can be implemented.

TABLE 2

Comparison of SPS and conventional sintering methods

| Stage | Feature | SPS | Conventional |
|---|---|---|---|
| Pre-sintering | Modify starting powder | Not required | Required |
| | Cold compaction of green body | Not required | Required |
| | Temperature ramp rate | 100-200° C./min | 1-5° C./min |
| | Maximum sintering temperature | 1050° C. for $UO_2$ | 1600° C. |
| | Hold time | 0.5-5 min | 4 hrs |
| | Total sintering run time | <1 hr | ~15 hrs. |
| | Pressure | 20-80 MPa | No |
| Sintering | Sintering environment | Vacuum (~10Pa) | Gaseous |
| | Dimensional control | Yes | Limited |
| | Stoichiometry during sintering | Changed | Unchanged |
| | Control of Grain growth | High | Low |
| | Produce near net shape pellets | Yes | yes |
| | Use difficult-to-sinter materials | Yes | limited |
| Post-sintering | Reduction of sintered pellet | Powder stoichiometry dependent | Yes |
| | Additional machining needed | Not necessarily | Yes |

$UO_2$—SiC Composite Fuel Pellets

Uranium dioxide powder was supplied by Los Alamos National Laboratory (Los Alamos, NM). All sintering was performed using the as-received $UO_{2.11}$ powders. β—SiC whiskers (3C—SiC) were obtained from Advanced Composite Materials, Greer, SC (SC-9D, deagglomerated SiC whiskers) and possess an aspect ratio, diameter, and length that exceeds 10:1, 0.65 µm, and 10 µm, respectively. β—SiC powder (3C—SiC) having a mean diameter of 1 µm was obtained from Alfa Aesar Inc, Ward Hill, MA In separate runs, either SiC whiskers (SiCw) or SiC powders (SiCp) were used to produce $UO_2$—SiC composite fuel pellets. FIG. 24 shows SEM images of as received β—SiC whisker and powder morphologies. $UO_2$ and 10 vol % (about 3.24 wt %) SiC were blended for 1 hour with the aid of 2,3-dihydroperfluoropentane using a SPEX 8000 shaker. After mixing, the blending aid was allowed to evaporate in a fume hood, leaving no residual contamination. This process resulted in homogeneous dispersion of SiC whiskers and powder particles in $UO_2$ matrix.

Spark plasma sintering (SPS) and traditional oxidative sintering processes were employed for comparison purposes. Green body pellets were made for oxidative sintering by compressing the blended $UO_2$—SiC powder at 200 MPa for 10 minutes in a stainless steel die. The die walls were lubricated with a film of stearic acid to prevent fracture of 12.7 mm green body pellets while removing from the die. The green body pellets were sintered in an alumina tube furnace with a ramp rate of 2.6° C./minutes until the temperature reached 1600° C. where the temperature was maintained for 4 hours. To maintain a hyper-stoichiometric state, an ultra high purity (UHP) Ar gas atmosphere was established by a continuous flow of Ar at a rate of 2 liter/minutes in the tube furnace during sintering.

Spark plasma sintering was performed in a Dr. Sinter® SPS-1030 system having the die assembly shown in FIG. 1. For SPS, the $UO_2$—SiC blended powder was loaded into the 12.7 mm diameter graphite die, with the inner die surface covered by a thin graphite foil to prevent reaction of the $UO_2$ with the die wall. Cylindrical graphite plugs were inserted into both ends of the die. The end of each plug that contacts the blended powder was coated with an aerosol of graphite (ZYP Coatings, Inc., Oak Ridge, TN) to prevent reaction. The ramp-up/down rate was set at 100° C./minutes and the hold time at maximum temperature was set at 5 minutes. An axial pressure of 40 MPa was applied at the beginning of the hold time. Maximum sintering temperatures were set at 1400, 1500, and 1600° C. for different fuel pellets.

After removal of the fuel pellets from the sintering chamber, reduction to stoichiometric $UO_2$ was carried out by the procedure in ASTM C 1430-07. Thermal treatment for the reduction was conducted in a furnace at 800° C. for six hours, in a 4% $H_2$—$N_2$ gas with water vapor added by passing the gas through a 35° C. water bath. For comparison purposes $UO_2$ pellets were prepared in parallel using identical SPS and oxidative sintering conditions.

The density of the $UO_2$—SiC composite pellets was measured on paraffin wax coated pellets using the Archimedean immersion method. The paraffin coated pellet was weighed three times in water and the average density was calculated.

Fuel pellets were polished with successively smaller grinding medium with a minimum 0.04 micron colloidal silica used for the final polish. Grain boundary relief was produced by thermal etching at 1340° C. for 4 hours in an Argon atmosphere. SEM (JEOL 6335F), micrographs of the $UO_2$—SiC fuel pellets were taken using the secondary electron mode with the average grain size determined by the line intercept method. To determine elemental diffusion ranges, penetration curves of U and Si along a line normal to the interface of $UO_2$—SiC were obtained by Energy Dispersive X-ray Spectroscopy (EDS) coupled with high resolution FE-SEM.

Reaction products formed upon sintering were determined by X-Ray Diffraction (Philips APD 3720) on the pellets for the composite fuel pellets having $UO_2$-70 vol % (~41.27 wt %) SiC pellets prepared in the manner of the $UO_2$-10 vol % SiC pellets.

Thermal conductivities of the fuel pellets were measured using an Anter Flashline®3000 system, where the derivation of thermal diffusivity, α, and specific heat capacity, $C_p$, were based on the measurement of the rising temperature on the back surface of a sample caused by a pulsed laser beam on the sample's front surface. Measurements were performed in triplicate at 100, 500, and 900° C. from which the average conductivity at each temperature was calculated. Thermal diffusivity, α, in m2/s, is given by, $0.1388 L2/t_{1/2}$, where L is the thickness of the specimen in m, and $t_{1/2}$ is the time in seconds for the rear surface temperature to reach 50% of its maximum value. The specific heat capacity, $C_p$, is given by Q/dT·m, where Q is the energy of the pulsed laser beam, determined by comparing the maximum value of the temperature rise to that of a reference, m is the mass of the specimen, and dT is the maximum value of the temperature rise. Pyroceram, a certified reference glass-ceramic material, was used as the reference pellet due to its similar conductivity with $UO_2$. By multiplying density with α and Cp, thermal conductivity was calculated.

$UO_2$ pellets produced via oxidative sintering (a) and SPS (b) are shown in FIGS. 25A and 25B, respectively. Each pellet was of 12.5 mm diameter and 2-4 mm thick. Pellets were cut and prepared for characterization as indicated above. The measured relative densities of the oxidative and SPS sintered $UO_2$—SiC fuel pellets prepared with various maximum sintering temperatures are shown in FIG. 26. The density of sintered $UO_2$-10 vol % SiC pellets increased with the maximum sintering temperature. The highest density for an oxidative sintered pellet was 88.91% TD. In contrast, the SPS sintered fuel pellets having a maximum sintering temperature of at least 1400° C. displayed densities between 91.25 and 97.78% TD.

Figures 27, 27A, 27B:
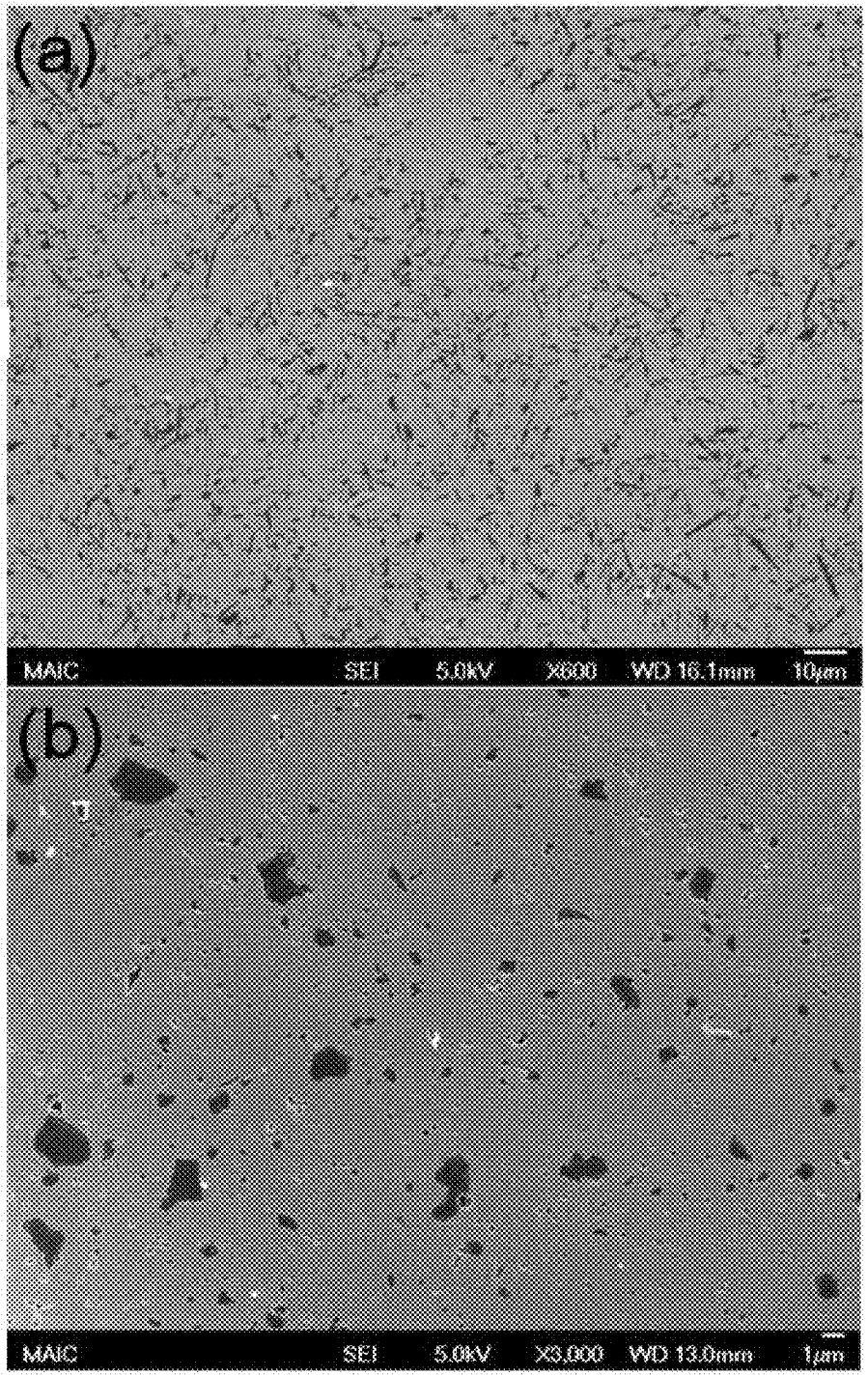
FIG. 27 shows SEM images of polished surfaces of high density $UO_2$—SiC (10 vol %) composite fuel pellets from a) SiCw (whisker) and b) SiCp (powder) pellets showing uniform dispersion of SiC, according to an embodiment of the invention.
Figure 28:
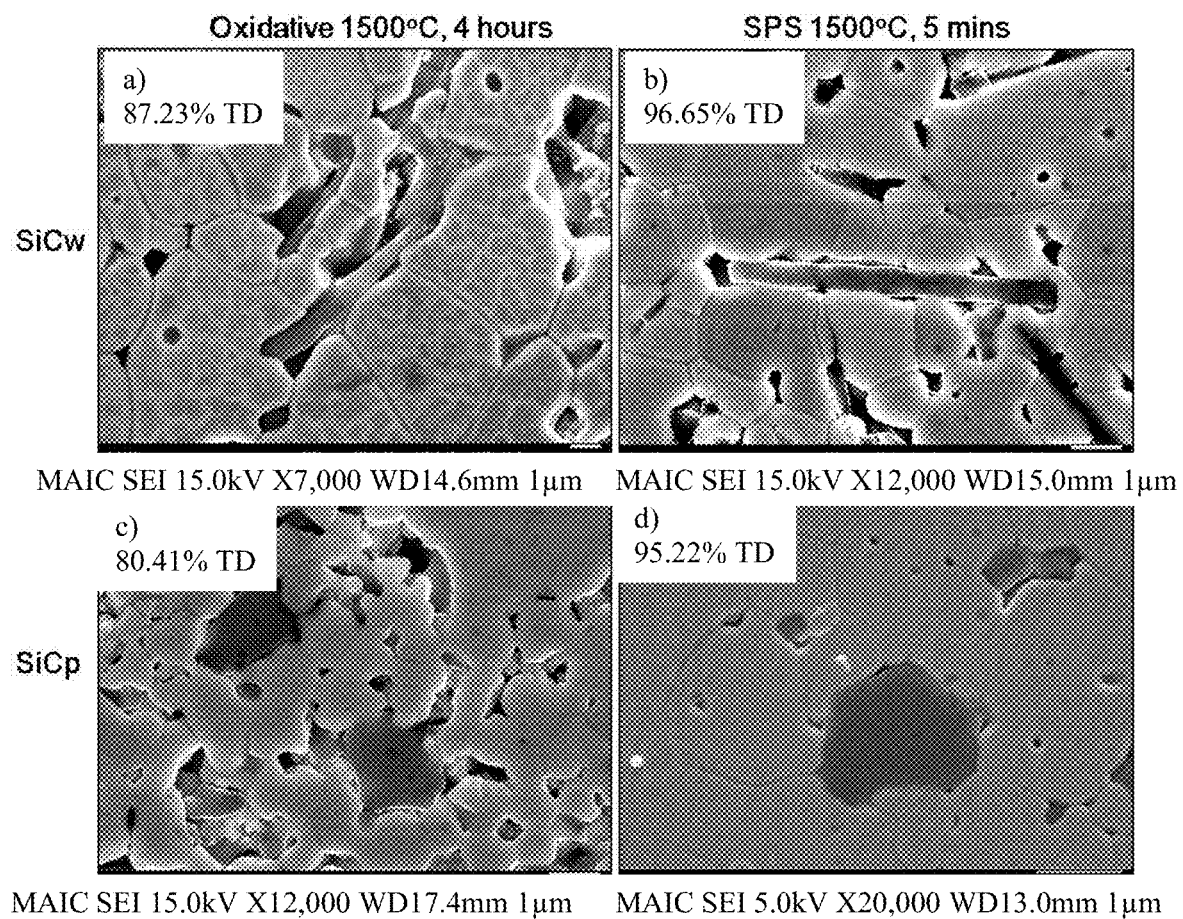
FIG. 28 shows SEM images of $UO_2$—SiC (10 vol %) composite fuel pellets formed by: a) and c) oxidative sintering at 1500° C. for 4 hours with SiC whiskers and powder, respectively; and b) and d) SPS at 1500° C. with a five minute hold time with SiC whiskers and powder, respectively, according to an embodiment of the invention.

FIG. 27 shows the distributions of SiCw and SiCp in the composite fuel pellets. Both the whiskers and particles appear as uniformly distributed without agglomeration. This is attributed to the use of 2,3-dihydroperfluoropentane as a dispersing agent during green compact preparation. $UO_2$-10 vol % SiC fuel pellets sintered at 1500° C. using SiCw and SiCp and oxidative sintering and SPS develop the micromorphologies shown in FIG. 28. Greater porosity and poor interfacial contact were observed for fuel pellets prepared by oxidative sintering than for the pellets prepared using SPS. Good interfacial contact is very beneficial if a highly thermal conductive fuel pellet is desired, as the presence of voids at the interface of two grains or poor interfacial contact between the two phases inhibits heat transfer. The high level of porosity in the oxidative sintered pellet, shown in FIGS. 28 a) and c) is also reflected in the measured density of the fuel pellets, as illustrated in FIG. 26. The density and interfacial contact is greater for the fuel pellet compositions sintered by SPS, as indicated in FIG. 7b) and d). The improved interfacial contact illustrates the advantage of SPS for sintering for high thermal conductivity $UO_2$—SiC pellets, according to an embodiment of the invention.

Figure 29:
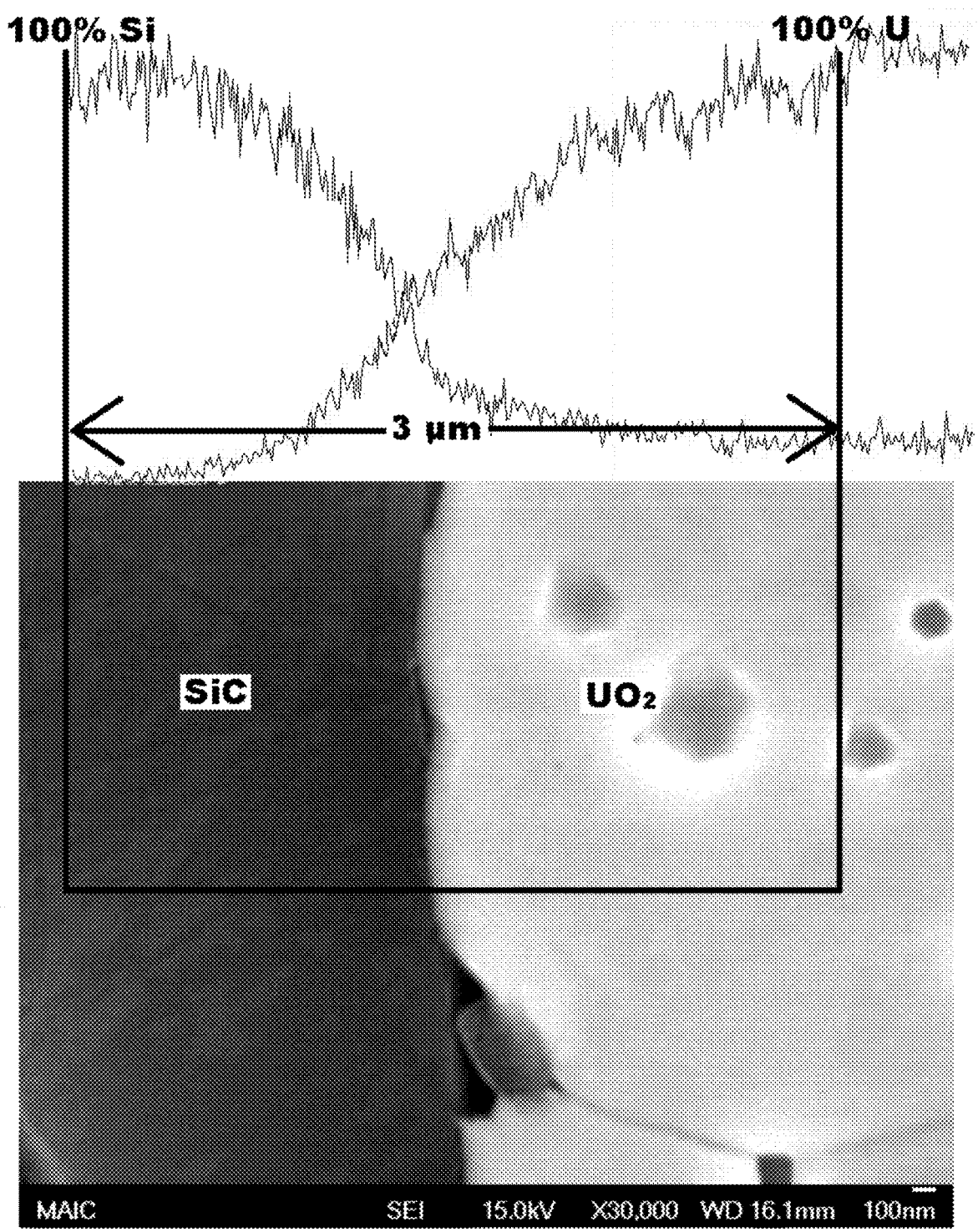
FIG. 29 shows an SEM image correlated with an EDS line scan across the interface of $UO_2$—SiC grains in a composite pellet fabricated by SPS at 1600° C., according to an embodiment of the invention.

FIG. 29 shows a high magnification of a $UO_2$—SiC interface for a SPS sintered fuel pellet prepared with a maximum temperature of 1600° C. maintained for 5 minutes. The separation between the two phases is normally less than 100 nm wide. EDS line scanning was performed to determine the uranium and silicon concentration profiles across the interface. The concentration profile, shown in FIG. 29, displays an approximately 3 μm interpenetration of the two elements. These profiles also illustrate that uranium penetrates to about 1.17 μm into the SiC phase, whereas Si penetrates into the $UO_2$ by about 1.84 m. Thus uranium penetrates SiC approximately 36% less than does SiC into $UO_2$. If one assumes that both materials have similar proportions of vacancy defects in their lattice, this penetration difference is consistent with the greater atomic density and weight of uranium relative to that of silicon.

Figure 30:
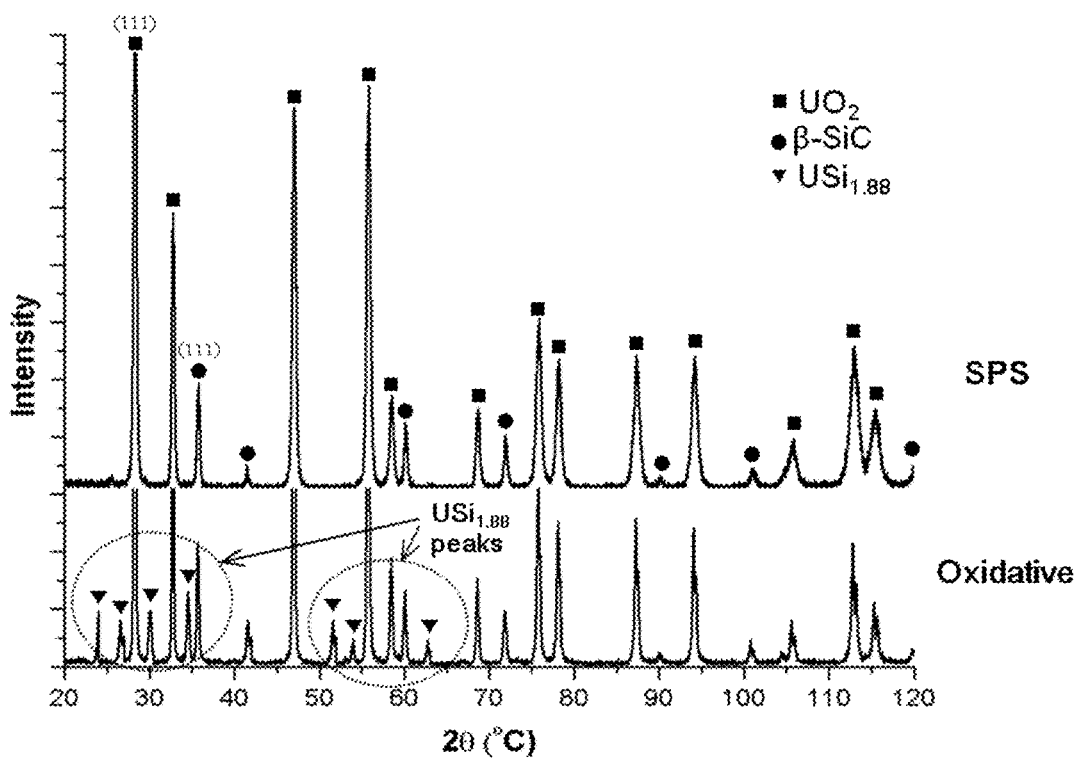
FIG. 30 shows XRD spectra of $UO_2$—SiC (70 vol %) pellet sintered by SPS, top, and oxidative sintering, bottom, at 1600° C., where the peaks contained within the dotted circles indicate signals form a $USi_{1.88}$ phase.

Controlling reactions between SiC and $UO_2$ during high temperature sintering is critical for achieving useful $UO_2$—SiC pellets, because the formation of reaction products at the $UO_2$—SiC interface may lead to poor thermal properties. XRD was employed to analyze for reaction products at the $UO_2$—SiC interface. FIG. 30 shows XRD spectra obtained from oxidative sintered $UO_2$-70 vol % SiC pellets held at 1600° C. for four hours and SPS 1600° C. for five minutes. A $USi_{1.88}$ peak is clearly seen in the oxidative sintered fuel pellet but is not detected for the fuel pellet fabricated by SPS. In the SPS, the pellet stays above 1370° C. for only 9.6 minutes as opposed to 6.9 hour hold for oxidative sintering. Long sintering times allow the diffusion of chemical species, formation of intermetallics, and gas phases, such as CO or $CO_2$. Intermetallics increase the number of phonon scattering cites at the interfaces. Gas phases may hinder the interfacial contact of $UO_2$—SiC by forming voids or causing separation. Both of these defects can significantly reduce the thermal conductivity of the composite pellet.

Figure 31:
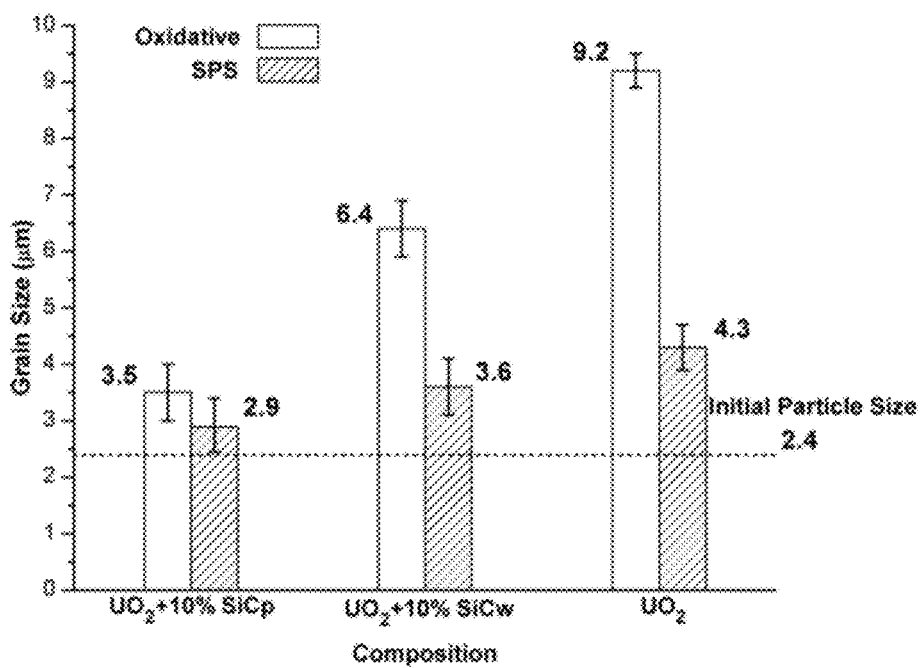
FIG. 31 shows bar graphs of $UO_2$ grain size in 10 vol % SiC composite fuel pellets where the SiC is added as a powder or whiskers and the grain size for 100% $UO_2$ fuel pellets, for comparison, using oxidative sintering and SPS, according to an embodiment of the invention.

The average grain size in fuel pellets sintered at 1500° C. by both oxidative sintering and SPS is shown in the bar graph of FIG. 31. In each pellet, the average grain size was determined from three micrographs from different regions of the pellets. $UO_2$ fuel pellets free of SiC display the greatest grain size. The grain size decreases with silicon carbide additions using either sintering method. This is consistent with insoluble second-phase particles dispersed randomly in a polycrystalline solid that pin the grain boundary movement. $UO_2$—SiCp pellets processed via oxidative and SPS sintering display 62% and 68.5% smaller grains, respectively, than the grains displayed by the SiC free $UO_2$ fuel pellet. In general, SPS fuel pellets have smaller grain sizes than oxidative sintered pellets, which have much greater time frames for grain growth. A 53.3% smaller grain size was observed for the $UO_2$ pellet made by SPS than in oxidative sintered $UO_2$ pellet. $UO_2$—SiCp fuel pellets display a smaller grain size than do $UO_2$—SiCw fuel pellets. The mean volume of a single SiCw whisker is 3.32 μm³, $(0.65/2)^2 \times \pi \times 0$, while the mean volume of a SiCp powder particle is 0.39 μm³, $(0.5)^3 \times \pi$. Therefore SiCw comprising fuel pellets require only about 12% of the number of particles as the SiCp comprising fuel pellets for an equivalent volume of SiC in the fuel pellet, and the grain size is inversely affected by the amount of the SiC particles.

Figure 32:
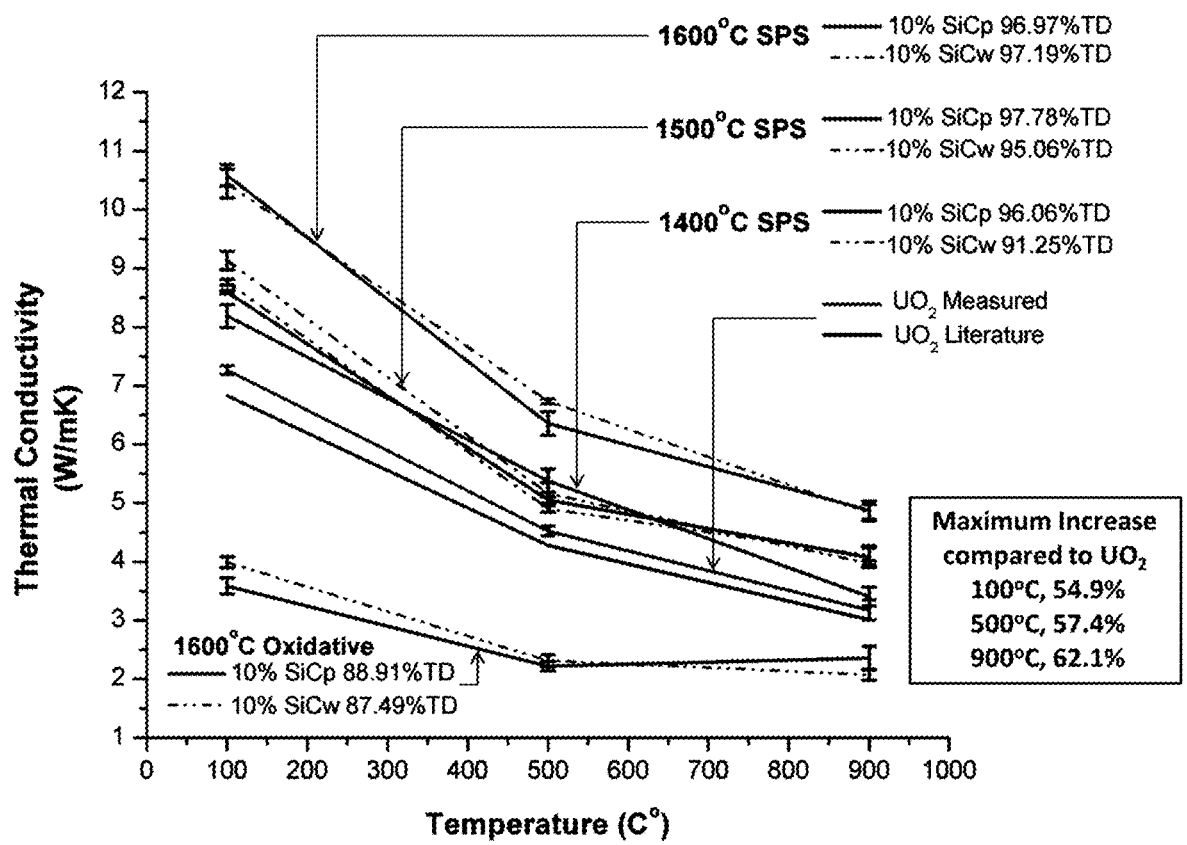
FIG. 32 shows plots of thermal conductivities of $UO_2$ and $UO_2$—SiC composite fuel pellets sintered by oxidative sintering or SPS, according to an embodiment of the invention.

Thermal conductivity measurements were carried out on $UO_2$—SiC fuel pellets sintered by oxidative sintering at 1600° C. and SPS at various temperatures. Measurements were carried out in triplicate at 100, 500, and 900° C. for each fuel pellet composition and the average conductivity values were calculated. The average thermal conductivity values of $UO_2$ from Fink, *J. Nucl. Mater.* 2000 279, 1-18. and the values determined by the method indicated above, are plotted in FIG. 32. SPS sintered $UO_2$—SiC composite fuel pellets revealed higher thermal conductivities than did $UO_2$ pellets. In general, $UO_2$—SiC composite fuel pellets with the higher observed thermal conductivities are observed for pellets processed at higher SPS sintering temperatures. Oxidative sintered pellets exhibited significantly lower conductivity values than did the $UO_2$ pellets. Maximum thermal conductivity enhancement was observed in $UO_2$—SiC composites sintered by SPS at 1600° C. with 54.9, 57.4, and 62.1% greater conductivity at 100, 500, and 900° C., respectively, compared to the literature $UO_2$ values. The SPS sintered composite pellets show a trend similar to that of $UO_2$ with respect to temperature, where a gradual decrease in conductivity was observed with increasing temperature. There is no significant difference in the thermal conductivity values observed for $UO_2$—SiCw and $UO_2$—SiCp comprising fuel pellets.

Additional Fabrication of UO2—SiC Composite Pellets

Uranium dioxide ($UO_{2.11}$) powder was obtained from Areva, Hanford, WA and the SiC powder was obtained from Superior Graphite, Inc., Chicago, IL The reported SiC particle mean diameters were 0.6, 1.0, 9.0, 16.9, and 55 μm. The $UO_2$ and SiC powders were mixed in a ceramic vial with stainless steel balls and a blending aid, 3-dihydroperfluoropentane, and blended in a SPEX 8000 shaker for one hour. For each mixing run the SiC mean particle size and the volume fraction of SiC powder in the mixture with $UO_2$ were varied as shown in Table 3, below to investigate their effect on the thermal conductivity of the resulting $UO_2$—SiC composite pellet. The SiC particles are high purity (>98%) powders. SiC particles with 1 μm size at 5, 10, 15, and 20 vol % were chosen to fabricate $UO_2$—SiC composite pellets. SiC dispersed in $UO_2$ powders were then sintered using a Dr. Sinter® SPS-1030 system at 1350° C. and 1450° C. for 5 minutes in a vacuum (~30 mTorr). The ramp up/down rate and mechanical pressure at the maximum sintering temperature were held constant at 100° C./min and 36 MPa, respectively. Treatment according to ASTM C 1430-07 was conducted on the sintered composite pellet to reduce $UO_{2+x}$ to stoichiometric $UO_{2.0}$. The ramp up/down rate and maximum temperature were set at 2.6° C./min and 800° C., respectively. The heat treatment was performed in a Lindberg® alumina tube furnace using 4% $H_2$—$N_2$ gas with the water vapor atmosphere maintained at 35° C.

TABLE 3

Details of SiC particle size, volume fraction, and sintering conditions in the SPS.*

| SiC particle mean diamter (μm) | SiC volume fraction (%) | Maximum sintering temperature (° C.) | % TD of the composite pellet ± SD |
|---|---|---|---|
| 0.6 | 5 | 1350 | 95.25 ± 0.24 |
| 1 | 5 | 1350 | 95.27 ± 0.3 |
| 1 | 5 | 1450 | 96.81 ± 0.39 |
| 1 | 10 | 1450 | 96.63 ± 0.35 |
| 1 | 15 | 1450 | 95.14 ± 0.23 |
| 1 | 20 | 1450 | 94.41 ± 0.3 |
| 9 | 5 | 1350 | 95.15 ± 0.09 |
| 16.9 | 5 | 1350 | 94.75 ± 0.17 |
| 55 | 5 | 1350 | 95.1 ± 0.13 |

*Hold time = 5 mins; ramp up/down rate = 100° C./min; pressure = 36 MPa.

The weight of each pellet in air and water was measured and the average density was calculated from three weight measurements per pellet using the Archimedes principle. The measured density of the composite was then compared with theoretical density obtained from the rule of mixture.

$$\rho_c = \rho_{UO_2}(1 - V_p) + \rho_{SiC} V_p \quad (6)$$

where $\rho_{UO2}$, $\rho_{SiC}$, and $V_p$ are the densities of $UO_2$ and SiC, and the SiC volume fraction, respectively.

The microstructure of the fabricated composite pellets was observed using a scanning electron microscope (SEM, JEOL JSM-6335F). The pellets were metallographically polished with successively smaller grit SiC abrasive paper and finally with 0.06 μm colloidal silica. The surface was thermally etched at 1340° C. in Ar atmosphere for 4 hours to reveal the grain boundaries of $UO_2$ matrix in the composite pellets. The measurement of thermal diffusivity was carried out at 100, 500, and 900° C. using a laser flash instrument (AnterFlashline®3000) with a Xenon discharge pulse for 1 μs duration. Three measurements were performed at each temperature on each pellet and the average diffusivity was obtained. The specific heat capacity of $UO_2$—SiC composite pellet was calculated using the Neumann-kopp rule:

$$C_p = C_{UO_2}(1 - f_p) + C_{SiC} f_p \quad (7)$$

where $C_{UO2}$, $C_{SiC}$, and $f_p$ are theoretical specific heat capacities of $UO_2$ and SiC, and weight fraction of SiC particles, respectively, at a specific temperature. $C_{UO2}$ and $C_{SiC}$ at 100° C., 500° C., and 900° C. are listed in Table 4. The thermal conductivity, K, of composite pellets was then determined from the relation:

$$K = DC_p \rho_C \quad (8)$$

where D and $\rho_c$ are the thermal diffusivity and density of the composite, respectively.

TABLE 4

| | Thermal properties of UO$_2$ and SiC | | | | | | |
|---|---|---|---|---|---|---|---|
| | Thermal expansion coefficient (K$^{-1}$) at | Specific heat, C$_p$ (J/kg · K) at | | | Thermal Conductivity, K at | | |
| Material | 25° C. | 100° C. | 500° C. | 900° C. | 100° C. | 500° C. | 900° C. |
| UO$_2$ | 9.93 × 10$^{-6}$ | 258.17 | 304.62 | 314.17 | 6.83 | 4.28 | 3.01 |
| β-SiC | 4.4 × 10$^{-6}$ | 798.2 | 1139.1 | 1243.31 | 273.64 | 136.42 | 85.53 |

Size Effect of SiC Particles on UO$_2$-5 vol % SiC Composite Properties

Figure 33:
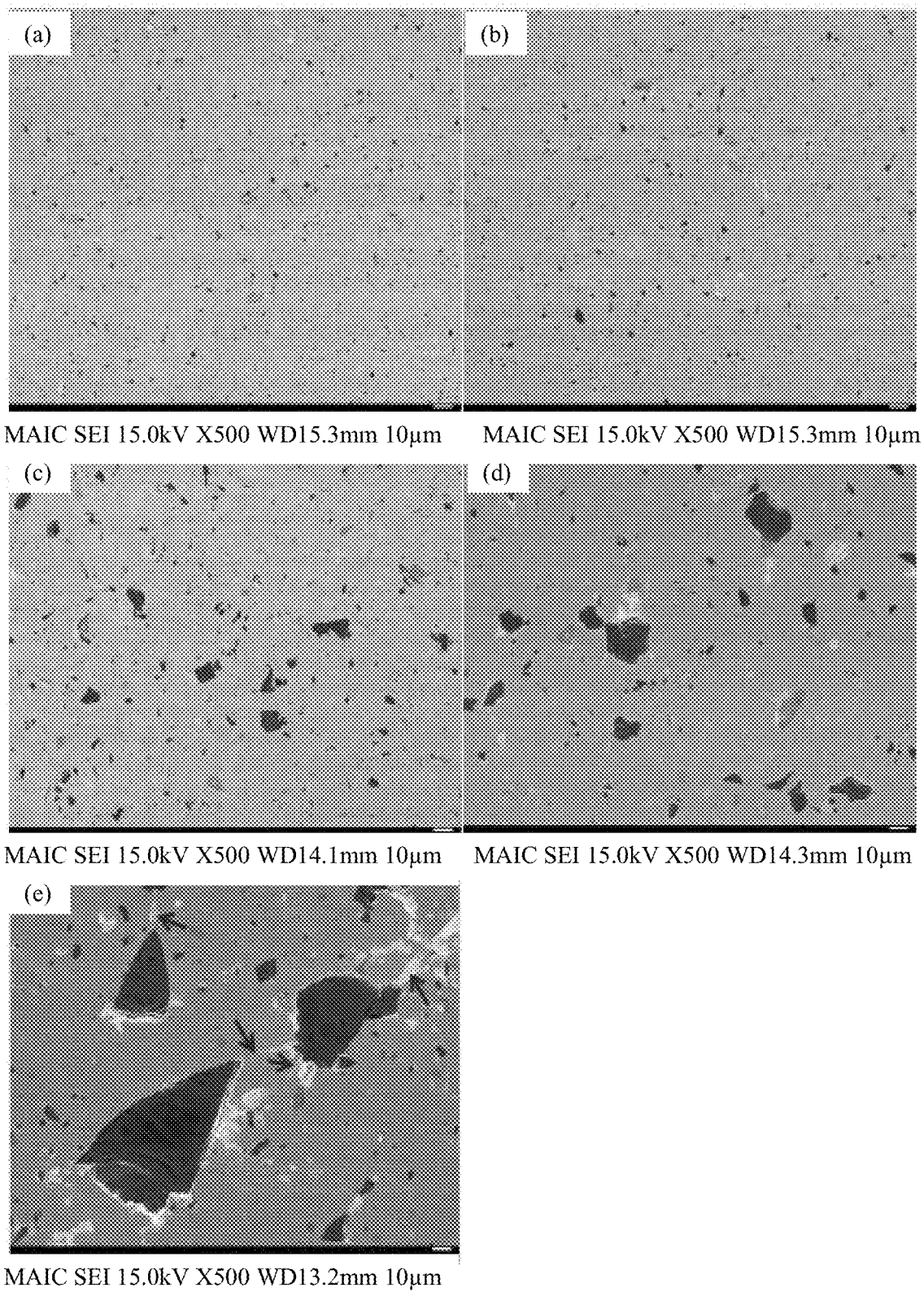
FIG. 33 shows SEM images of $UO_2$-5 vol % SiC pellets with the SiC particle mean diameter of (a) 0.6 μm, (b) (c) 9 μm, (d) 16.9 μm, and (e) 55 μm according to an embodiment of the invention, where micro-cracks originating from large size SiC particles are observed in (e).

The micro-morphologies and thermal properties of UO$_2$-5 vol % SiC composite fuel pellets containing SiC particles with five different sizes (See Table 3) were examined. FIG. 33 shows the microstructures of these composites where the SiC particles appear black and the brighter area indicates the UO$_2$ matrix. The SiC particles appear to be homogeneously dispersed in the UO$_2$ matrix in all the composites. However, as shown in FIG. 33(e), in the composite containing 55 μm SiC particles, distinct radial micro-cracks were observed originating at an edge of the interface between a SiC particle and UO$_2$ matrix and propagating towards another SiC particle.

Figure 34:
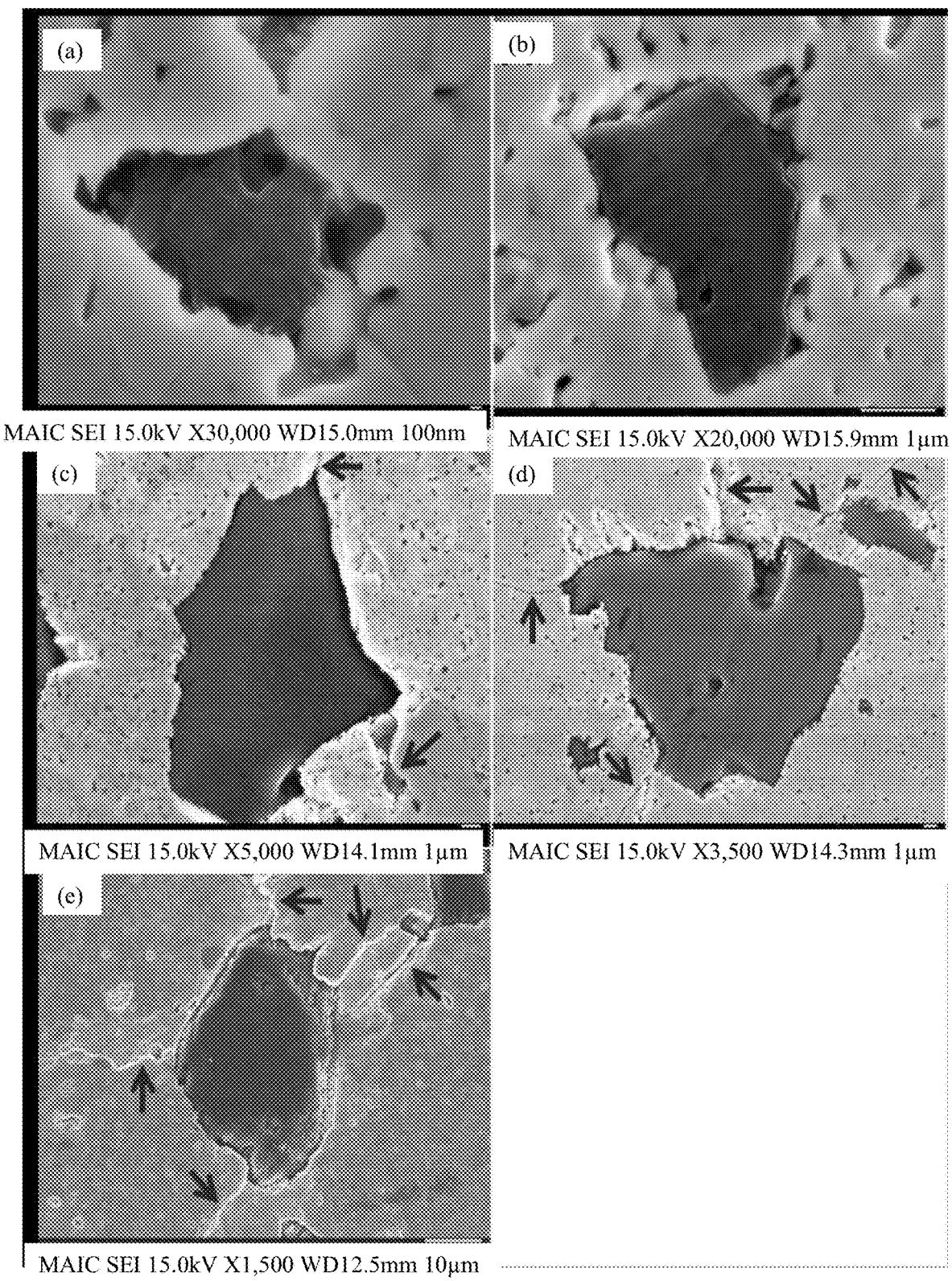
FIG. 34 shows SEM images of $UO_2$-5 vol % SiC pellets with mean diameter of (a) 0.6 μm, (b) 1 (c) 9 μm, (d) 16.9 μm, and (e) 55 μm, according to an embodiment of the invention, where micro-cracks in the matrix and between two SiC particles are identified by arrows.

The interfaces between the UO$_2$ matrix and SiC particles in UO$_2$-5 vol % SiC composite pellets with different sized SiC grains are shown in FIG. 34. The micro-cracks emanating from the SiC particles are clearly seen in FIGS. 34 (c), (d), and (e) indicating that micro-cracks evolve in composites with SiC particles larger than 9 μm in size. However, the micro cracking is less severe in composites with SiC particles of size 9 μm and 16.9 μm compared to the composite containing 55 μm diameter SiC particles. No visible cracks in the micro structure were seen in the composite pellets with smaller size SiC particles.

Figure 35:
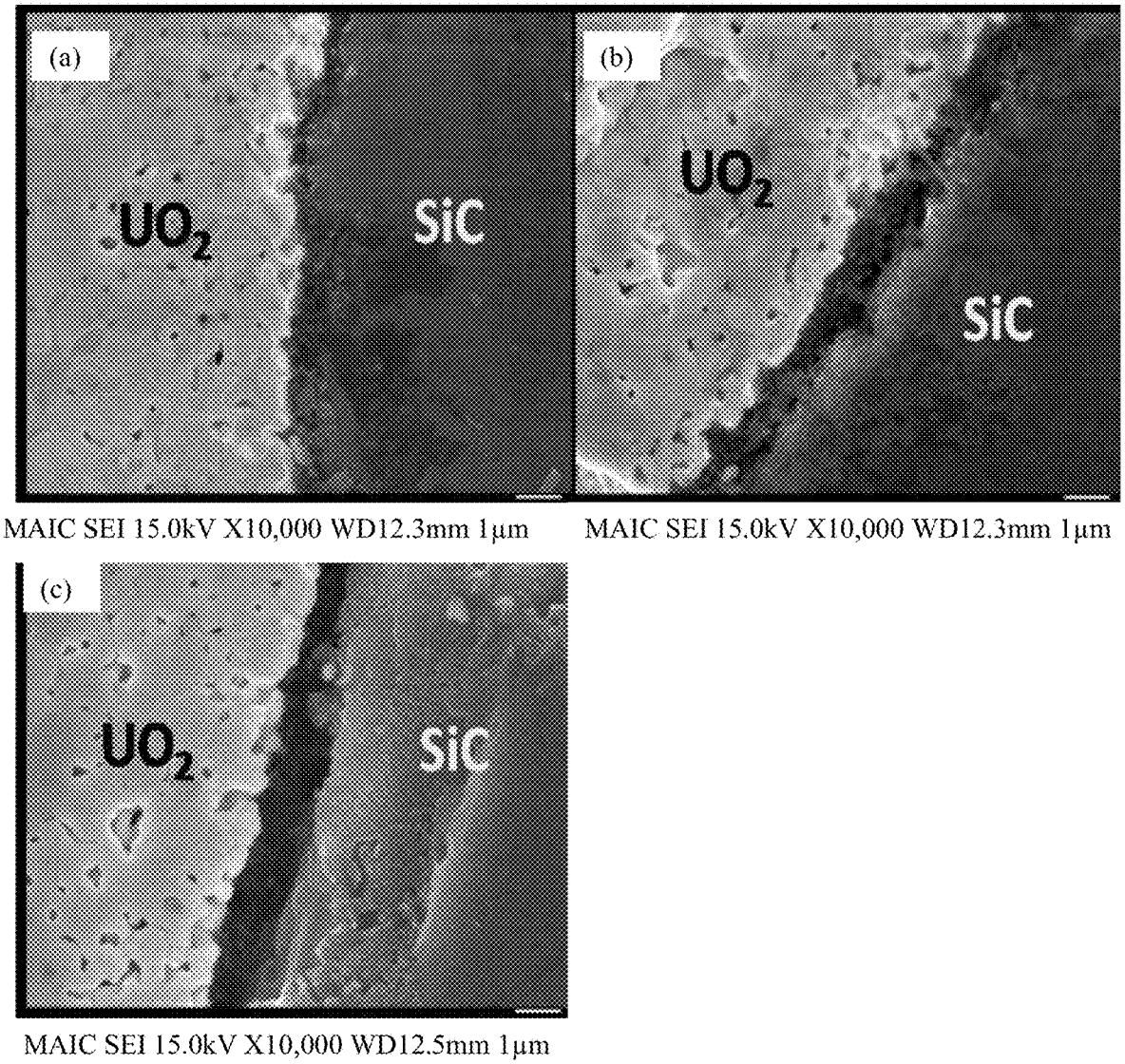
FIG. 35 shows SEM images of $UO_2$-5 vol % SiC pellets, according to an embodiment of the invention, with interfacial dedonding for SiC particles of size (a) 9 μm, (b) 16.9 μm, and (c) 55 μm.

With increasing particle size there is a larger separation between the SiC particle and the UO$_2$ matrix. FIG. 35 shows the interfacial debonding between UO$_2$ and SiC particles in each composite with the three largest size SiC particles. While the interfacial contact between UO$_2$ grains and 9 μm SiC particle is fairly good, a visible gap is observed at the interface between UO$_2$ grains and SiC particle when the particle size is 16.9 μm or greater.

Micro-cracking and interfacial debonding occur in various composites during the sintering process due to a mismatch in coefficients of thermal expansion (CTE) between the matrix and the second phase particles.

As indicated in Table 4, the thermal expansion coefficient of UO$_2$ is more than twice that of SiC so that the matrix expands into the particles during the cooling process forcing the SiC particles into compression. The larger the particle size, the more will be the induced compressive stress due to the lower surface area-to-volume ratio of the larger particles. When the stress intensity at the interface exceeds the grain boundary toughness of matrix material, spontaneous micro-cracking is initiated from the interface into the matrix in a ceramic composite. The induced internal stress caused by a mismatch in CTE of constituents in a composite also leads to a partial interfacial debonding. The degree of interfacial debonding is dependent on the level of mismatch in CTE, elastic properties of the constituents, the temperature range of cooling process, and the energy required to create a new surface. Because these thermal cracks and the interfacial debonding in composite pellets obstruct the pathway for heat conduction, extensive cracking and poor interfacial contact obviously lead to lower thermal conductivity.

The measured densities of UO$_2$—SiC composite fuel pellets containing 5 vol % SiC particles but of different sizes are shown in Table 1. The densities of all composite pellets are near 95% TD and appear not to be dependent on the SiC particle size. Because the thermal conductivity is directly proportional to the density as seen in Eq. (8), and the density of the composite pellet is not dependent on the SiC particle size, the measured pellet thermal conductivity will mostly depend on the size of SiC particles as will be discussed in the following paragraph.

Figure 36:
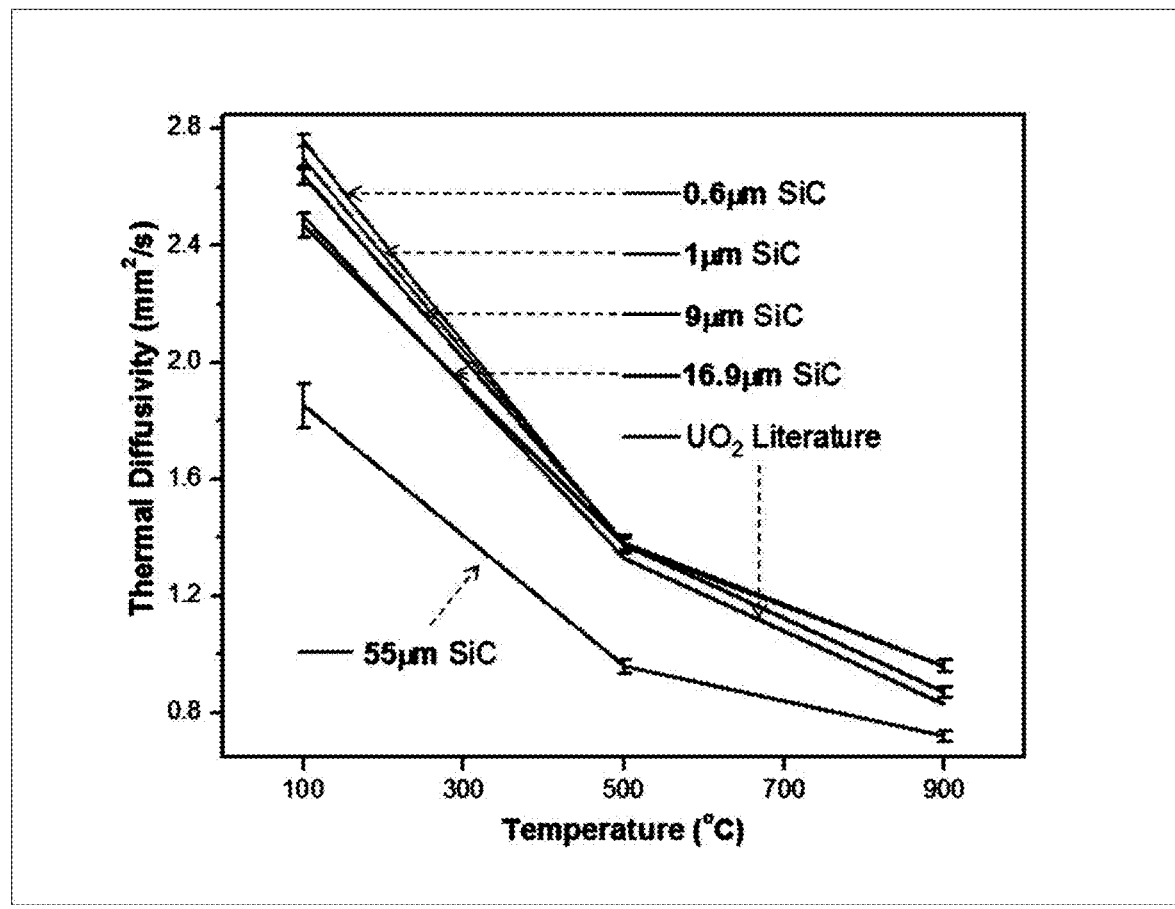
FIG. 36 shows a plot of the thermal diffusivity of $UO_2$-5 vol % SiC composite pellets, according to an embodiment of the invention, with various SiC particle sizes as a function of temperature.

FIG. 36 shows the temperature dependence of the measured thermal diffusivity for UO$_2$-5 vol % SiC composite pellets containing various sizes of SiC particles. The red line refers to the literature value of 95% dense UO$_2$. In general, UO$_2$ thermal diffusivity decreases with temperature due to increased phonon-phonon scattering at higher temperatures. This trend is maintained in the thermal diffusivity of UO$_2$-5 vol % SiC composite pellets as well. In general, the larger the SiC particle size the lower the thermal diffusivity. However, the thermal diffusivity of the composite pellets containing 55 μm SiC particles shows a significantly lower thermal diffusivity than the literature UO$_2$ value due to extensive micro-cracks and severe interfacial debonding as shown in FIG. 34 and FIG. 35.

Figure 37:
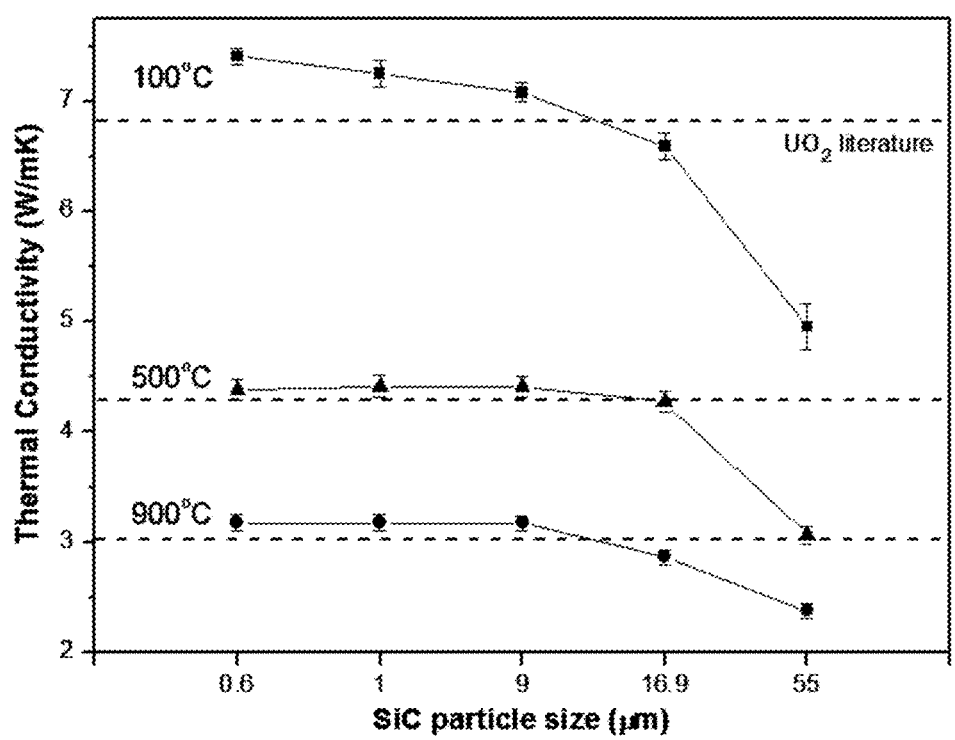
FIG. 37 shows a plot of the thermal conductivity of $UO_2$-5 vol % SiC pellets, according to an embodiment of the invention, with various sizes of SiC particles at the selected temperatures where dotted lines are literature values of $UO_2$ thermal conductivity at each temperature.

FIG. 37 shows the thermal conductivity determined by Eq. 8 using the measured thermal diffusivity (FIG. 36), calculated specific heat capacity, and the measured density (Table 3) for composites with different SiC size particles at three temperatures. The specific heat capacities of UO$_2$ and β—SiC, shown in Table 4, were utilized to determine that of the UO$_2$-5 vol % SiC composite. Using Eq. 7, the specific heat capacities at 100, 500, and 900° C. were calculated to be 266.5, 317.5, and 328.5 J/kg·K, respectively. While the composite pellets containing 0.6, 1.0, and 9.0 μm diameter SiC particles showed enhanced thermal conductivity, the composite pellets containing 16.9 and 55 μm diameter SiC particles revealed lower thermal conductivity than a UO$_2$ pellet. The SiC particle size dependence of thermal conductivity at various temperatures is shown in FIG. 37. While marginal reduction in thermal conductivity in the pellets containing 16.9 μm SiC particles is noted, the reduction in pellets containing 55 μm diameter SiC particles is particularly large; a decrease of 21-28.3% depending on the testing temperature. These composite pellets with poor thermal conductivity and containing large SiC particles are the same pellets which exhibited micro-cracks and interfacial debonding next to the large SiC particles as shown in FIG. 34 and FIG. 35. These observations support the hypothesis that micro-cracking and interfacial debonding are responsible for the reduction in thermal conductivity of UO$_2$—SiC composite containing large SiC particles. The 55 μm diameter SiC particle composite pellet has the most severe micro-cracks and the largest interfacial debonding resulting in a greatly reduced thermal conductivity.

Effect of Volume Fraction of SiC Particles

Figure 38:
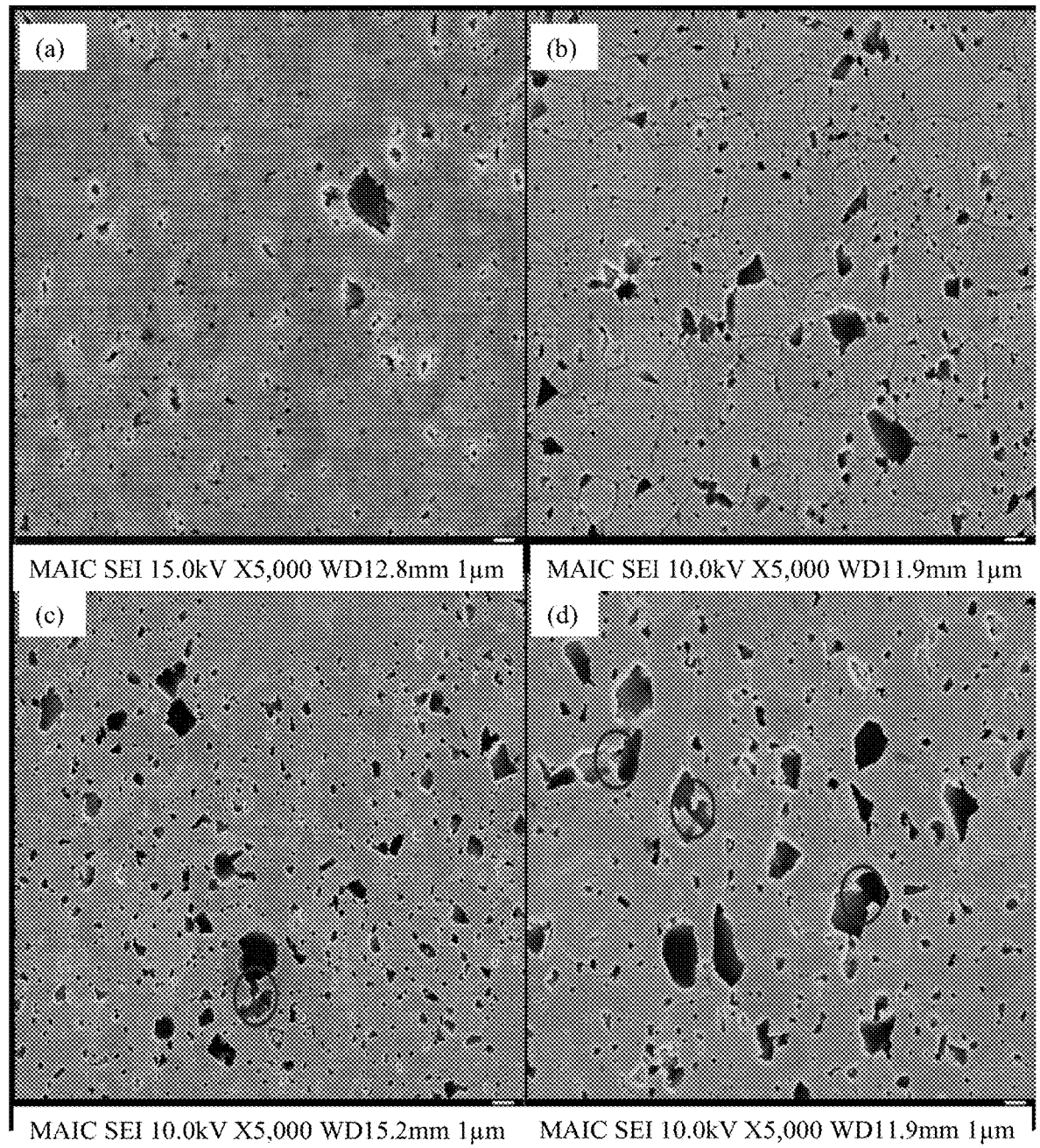
FIG. 38 shows SEM images of $UO_2$—SiC composites, according to an embodiment of the invention, containing (a) 5, (b) 10, (c) 15, and (d) 20 vol % of 1 μm SiC particles where circles are drawn around particle-particle interaction sites.

To understand of the influence of volume fraction of SiC particles on the thermal properties of $UO_2$—SiC composite pellets, we have chosen one SiC particle size (1 µm) and varied the volume fraction (see Table 3) at 5, 10, 15, and 20%. All the other variables were kept constant during the sintering process. Micro-structures of the four composite pellets revealing homogeneously dispersed 1 µm SiC particles are shown in FIG. 38. With increase in volume fraction, particle-particle interaction is noted as seen in FIGS. 38 (c) and (d).

Figure 39:
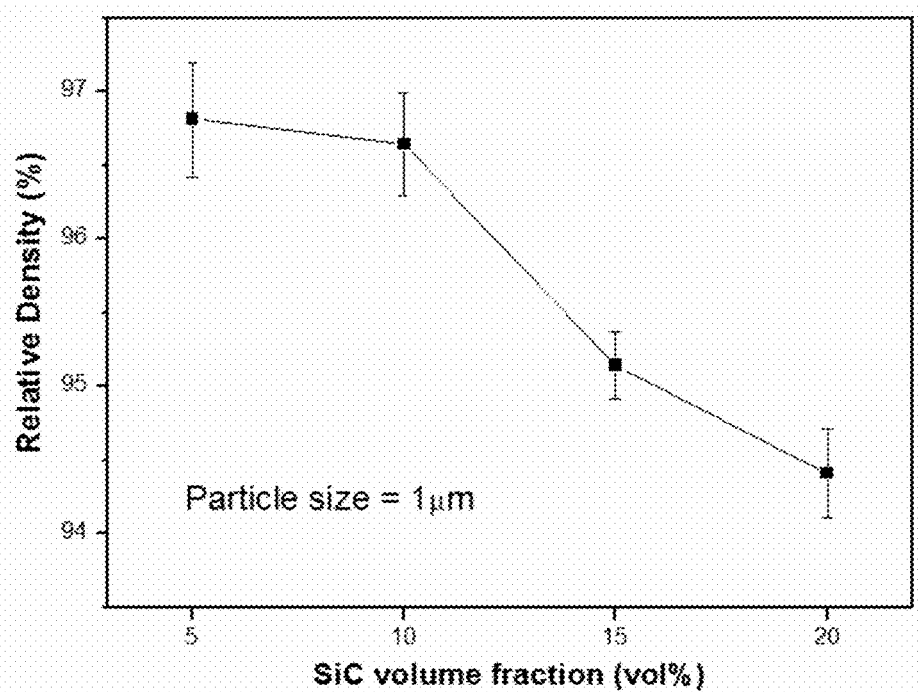
FIG. 39 is a plot of the Relative density of $UO_2$—SiC composite pellets, according to an embodiment of the invention, containing various fractions of 1 μm size SiC particles.

FIG. 39 reveals a decrease in the relative density of $UO_2$—SiC composite pellets with increasing SiC volume fraction. Increases in particle volume fraction hinders the consolidation of matrix grains.

Figure 40:
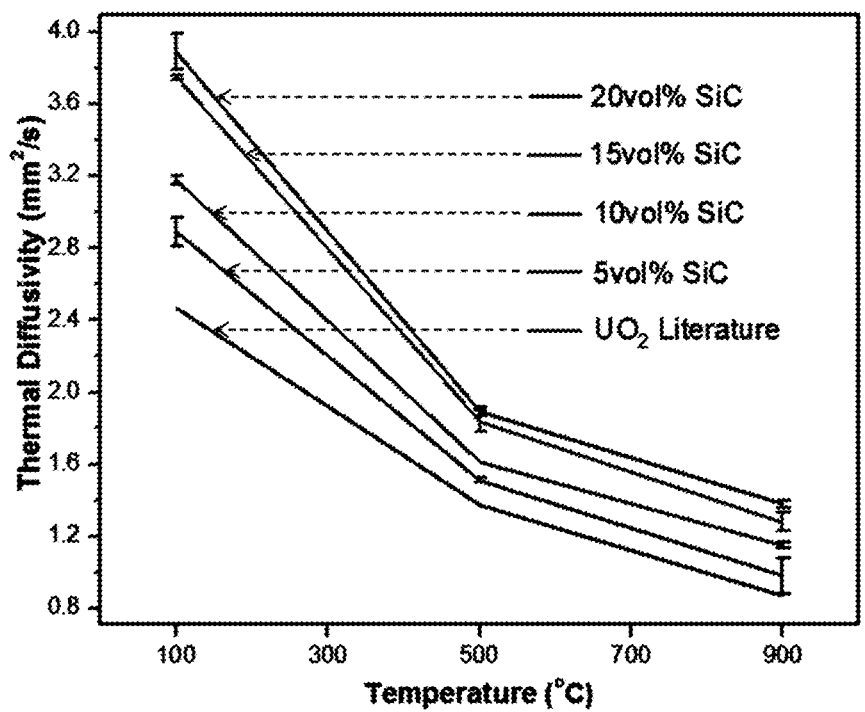
FIG. 40 shows plots of thermal diffusivity of $UO_2$—SiC composite pellets containing various volume fractions of 1 μm size SiC particles, according to an embodiment of the invention, as a function of temperature.

Measured thermal diffusivity of the composite pellets containing various volume fractions of 1 µm size SiC particles is shown in FIG. 40. Higher volume fraction of SiC particles results in a higher thermal diffusivity of the composite. This trend indicates that inclusion of higher thermal conducting particles into $UO_2$ matrix increases the diffusion of heat energy in the composite provided good interfacial bonding is maintained.

Figure 41:
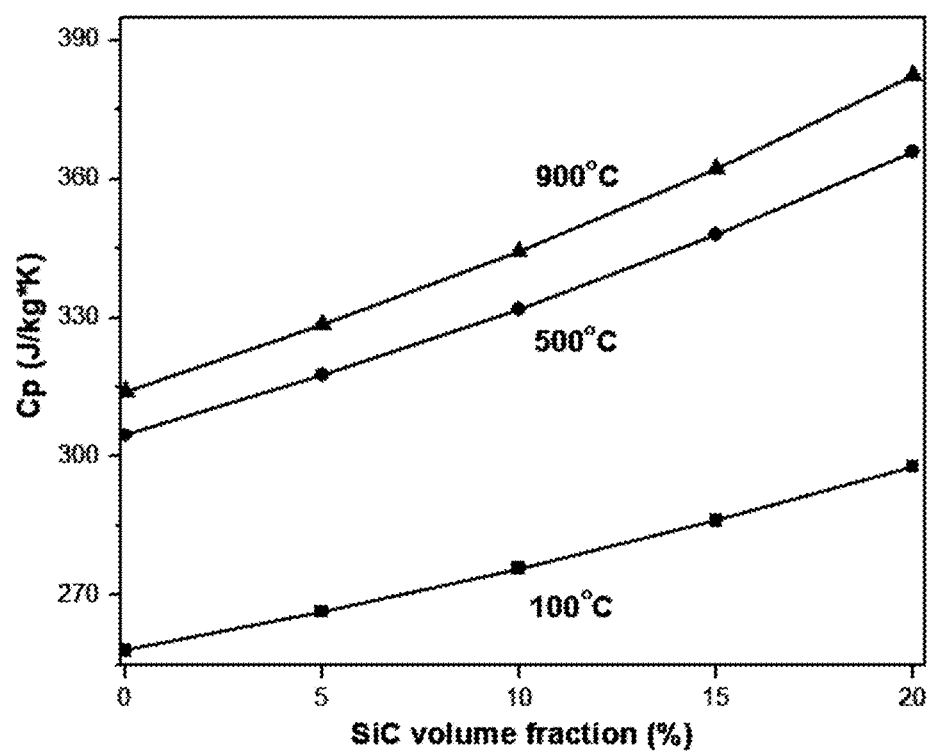
FIG. 41 is plots showing the temperature dependence of specific heat capacities of $UO_2$—SiC composite pellets, according to an embodiment of the invention, containing various volume fraction of 1 μm size SiC particles.

FIG. 41 reveals the calculated (Eq. 7) specific heat capacity (Cp) of $UO_2$—SiC composites containing various volume fractions of SiC particles at 100, 500, and 900° C. As the SiC volume fraction and temperature increase the specific heat capacity also increases. This is consistent with a larger number of molecular energy states available at higher temperature and the specific heat capacity follows Neumann-kopp rule (Eq. 7). Initially there is a significant increase in specific heat from 100 to 500° C. but this increase in Cp is lower from 500 to 900° C.

Hasselman et al. Journal of Composite Materials 1987; 21:508-15 provide an expression for calculating the effective thermal conductivity of a composite. For a composite containing spherical shaped particles dispersed homogeneously in a matrix material, the effective thermal conductivity is given by:

$$k_{eff} = k_m \frac{2\left(\frac{k_p}{k_m} - \frac{k_p}{ah_c} - 1\right)V_p + \frac{k_p}{k_m} + 2\frac{k_p}{ah_c} + 2}{\left(1 - \frac{k_p}{k_m} + \frac{k_p}{ah_c}\right)V_p + \frac{k_p}{k_m} + 2\frac{k_p}{ah_c} + 2} \quad (9)$$

where $k_{eff}$ is the effective thermal conductivity, subscripts p and m are particle and matrix, respectively, $V_p$ is the volume fraction of particles, a is the radius of particle, and $h_c$ is the interfacial thermal conductance. The reported interfacial thermal conductance $h_c$ accounting for the $UO_2$—SiC interface has not been reported to our knowledge. However, it can be estimated using the acoustic mismatch model of Swartz et al. Reviews of Modern Physics 1989; 61:605-68, where the interfacial thermal conductance is:

$$h_c \approx \frac{1}{2}\rho_m \cdot C_p \cdot \frac{v_m^3}{v_p^2} \cdot \frac{\rho_m \rho_p v_m v_p}{\rho_m v_m + \rho_p v_p} \quad (10)$$

where ρ is the density $C_p$ is the specific heat capacity of matrix, v is the phonon velocity, and subscript p and m refer to particle and matrix, respectively. The phonon velocities of $UO_2$ matrix and SiC particle can be estimated from the equation:

$$\frac{1}{v_l^2} + \frac{2}{v_t^2} = \frac{3}{v} \quad (11)$$

Figure 42:
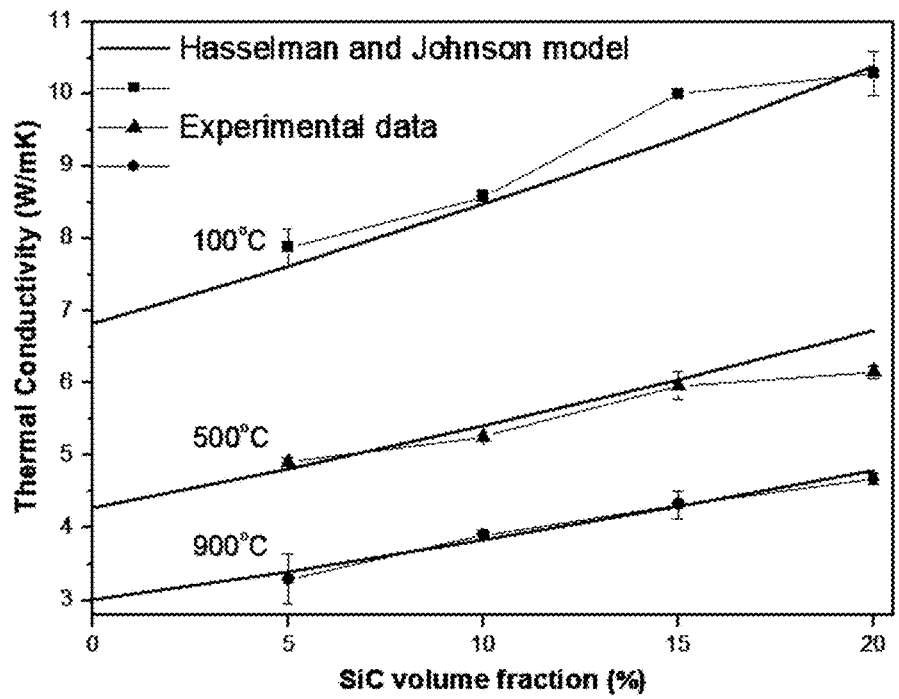
FIG. 42 is plots of calculated and experimentally determined thermal conductivities of $UO_2$—SiC composites, according to an embodiment of the invention, at selected temperatures with various volume fraction of 1 μm SiC particles, with $UO_2$ literature values at each temperature indicated at Vf=0.

Using input parameters with particle volume fraction (0.05-0.2), radius (0.5 µm), as listed in Table 1 into Hasselman and Johnson model (Eq. (9)), the comparison between experimentally obtained and theoretically calculated effective thermal conductivity is shown in FIG. 42. Experimentally measured density (FIG. 39), thermal diffusivity (FIG. 40), and the calculated specific heat (FIG. 41) were utilized to determine the experimental effective thermal conductivity using Eq. (8). The higher the volume fraction of SiC particles, the higher the thermal conductivity of the composite. The average increase in thermal conductivity with the addition of 5, 10, 15, and 20 vol % of SiC particles are 14.23, 26.44, 43.22, and 49.84%, respectively. Considering the error bar, great agreement between experimentally determined and theoretically calculated effective thermal conductivities is seen for the composite pellets containing 5, 10, and 15 vol % of SiC particles. The agreement is also much better at higher temperature (900° C.) than at lower temperature (100° C.).

Figure 43:
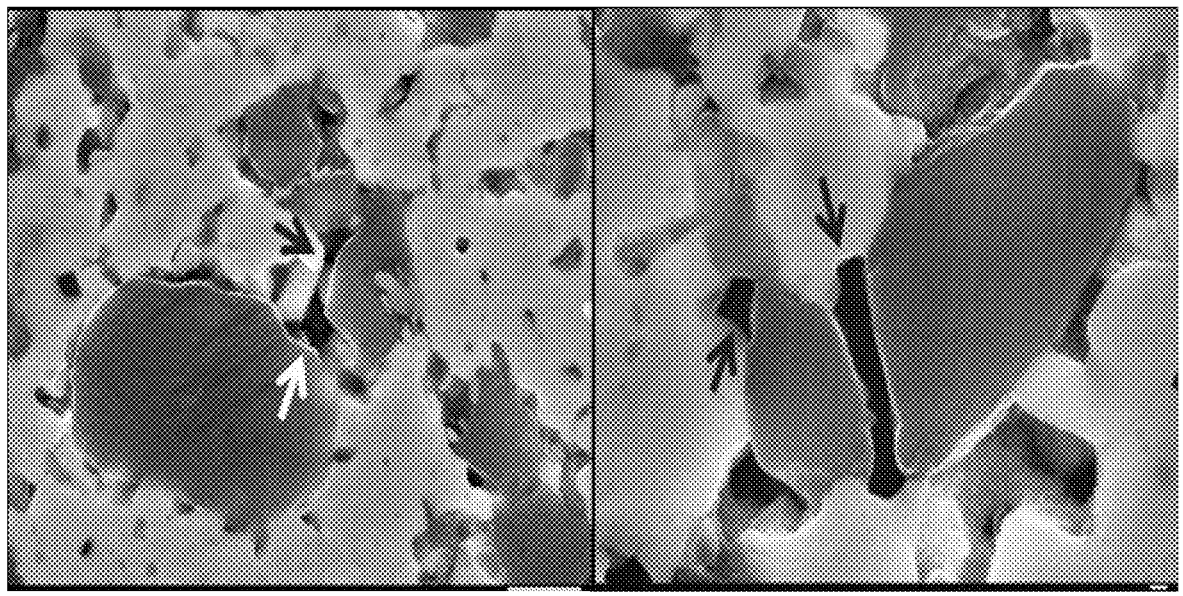
FIG. 43 shows SEM images of Interfacial contact between 1 μm SiC particles in a $UO_2$-20 vol % SiC composite, according to an embodiment of the invention, where interfacial porosities are indicated by arrows.

The lower experimental thermal conductivities of 20 vol % SiC can reflect the relatively lower densification and the abundance of particle-particle interactions of the composite containing higher volume fraction of SiC particles. As shown in FIG. 39, the composite containing 20 vol % of SiC has only 94.41% relative density and seemed to be responsible for decreasing the thermal conductivity (see Eq. 8). The interaction between SiC particles is seen in FIG. 38 and it is more abundant with increasing SiC volume fraction. The particle-particle interaction is not accounted for in Hasselman and Johnson model due to the complexity of the phenomena. Observation of the interfacial contact between SiC particles, shown in FIG. 43, indicates that pores are predominantly located at the interface reducing the overall thermal conductivity due to the phonon scattering. Non-ideal shape of SiC particles and thermal diffusivity measurement error also can reflect the difference between experimental and theoretical effective thermal conductivities. The irregularities in SiC particle shape can be clearly seen in FIG. 33 and FIG. 34. Because the Hasselman and Johnson model (Eq. 9) only accounts for spherical shaped secondary particles, a discrepancy between theoretical model and experimental measurement is expected. Thermal diffusivity measurement error possibly contributes to the difference between experimental and theoretical effective thermal conductivities. The difference between actual measurement temperature and the set up temperature and change in the density value of pellet at different temperatures may cause some error to the experimental thermal conductivity.

Relatively good agreement between the experimental and theoretical effective thermal conductivities of $UO_2$—SiC composites are observed. $UO_2$ matrix and 1 µm SiC particles are mechanically well contacted in $UO_2$—SiC composites thus improving the effective thermal conductivity. Moreover, both experiments and the theoretical model revealed that higher effective thermal conductivity is obtained with increasing SiC volume fraction. However, the utilized powder blending procedure and SPS process conditions, see Table 3, are only valid for fabrication of $UO_2$—SiC composites containing up to 15% SiC particles by volume.

Hence, SPS processed $UO_2$—SiC, according to an embodiment of the invention, offers a significantly shorter sintering time to yield a dense $UO_2$—SiC composite fuel pellet having a reduced formation of chemical products, better interfacial properties, and significantly better thermal conductivity than is observed for pellets obtained by oxidative sintering. Although it is generally observed that smaller grain size fuel pellets display lower thermal conductivities, SPS produced $UO_2$—SiC fuel pellets had superior thermal conductivities than do oxidative sintered $UO_2$—SiC fuel pellets that display larger grain sizes. $UO_2$—SiC composite fuel pellet, according to an embodiment of the invention, display a high density, good interfacial contact, and no extraneous intermetallics or other chemical by-products produced during sintering.

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

We claim:

1. A system for preparing a nuclear fuel pellet, comprising:
    a homogeneous dispersion of powders, as a nuclear fuel powder, the homogeneous dispersion of powders comprising uranium dioxide ($UO_2$) and a thermally conductive material selected from a metal or metal alloy, where the homogeneous dispersion of powders comprises 90 to 99 vol % of the $UO_2$ and the thermally conductive material has a thermal conductivity that is greater than 10 W/mK at 100° C.;
    a spark plasma sintering (SPS) apparatus;
    a die assembly loaded with the homogeneous dispersion of powders;
    a power supply associated with the SPS apparatus, the power supply configured to apply a pulsed current to the die assembly; and
    the SPS apparatus comprising a sintering chamber that receives the die assembly, where the SPS apparatus depressurizes the sintering chamber and increases temperature of the die assembly to a maximum temperature of 850 to 1600° C. as the pulsed current is applied to the die assembly, where the temperature is increased with a rate of increase of at least 50° C./minute after achieving a temperature of 600° C. and maintained at the maximum temperature for a period of 0.5 to 20 minutes while applying a controlled pressure of 25 to 100 MPa to the die assembly to form the nuclear fuel pellet, where the maximum temperature and the controlled pressure are held during the period until a density of more than 95% TD (theoretical density) of the $UO_2$, an average grain size of at least 4 µm absent inter-granular pores, and a thermal conductivity of at least 8 W/mK at 100° C. is attained.

2. The system of claim 1, wherein an inner surface of the die assembly is treated with graphite prior to the homogeneous dispersion of powders being loaded, the graphite treatment forming a graphite layer between the inner surface of the die and the homogeneous dispersion of powders loaded in the die assembly.

3. The system of claim 1, wherein the controlled pressure is a uniaxial pressure.

4. The system of claim 1, wherein the die assembly comprises a die loaded with the homogeneous dispersion of powders between a first punch and a second punch.

5. The system of claim 4, wherein the die is a graphite die and the first and second punches are graphite punches.

6. The system of claim 4, wherein the first and second punches are cylindrical punches configured to insert into opposite sides of the die.

7. The system of claim 4, wherein an inner surface of the die is covered by graphite foil.

8. The system of claim 4, wherein an end surface of the first and second punches are coated with an aerosol layer of graphite.

9. The system of claim 1, wherein an outer surface of the die assembly is at least partially wrapped in graphite felt.

10. The system of claim 1, comprising a temperature measurement device configured to monitor the temperature of the die assembly in the sintering chamber.

11. The system of claim 10, wherein the temperature measurement device is a radiation pyrometer.

12. The system of claim 1, wherein the nuclear fuel pellet is reduced by exposure to a reducing gas.

13. The system of claim 1, wherein the $UO_2$ comprises a mixture of oxides with a stoichiometry $UO_{2+x}$ where x is 0 to 0.25, and wherein the maximum temperature is 1050° C. to 1600° C.

14. The system of claim 13, wherein the controlled pressure is a uniaxial pressure of 30 to 45 MPa.

15. The system of claim 1, wherein the nuclear fuel powder comprises other oxidation states of uranium oxide, uranium nitride, thorium oxide, plutonium oxide, or any combination thereof.

16. The system of claim 1, wherein the nuclear fuel powder consists of $UO_2$ and the thermally conductive material.

17. The system of claim 16, wherein the thermally conductive material is uranium or uranium alloy.

* * * * *